(12) United States Patent
Tasaka

(10) Patent No.: US 9,646,380 B2
(45) Date of Patent: May 9, 2017

(54) IMAGE-DATA PROCESSING DEVICE AND IMAGE-DATA PROCESSING METHOD

(71) Applicant: Panasonic Intellectual Property Management Co., Ltd., Osaka (JP)

(72) Inventor: Kei Tasaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/557,873

(22) Filed: Dec. 2, 2014

(65) Prior Publication Data

US 2015/0086106 A1 Mar. 26, 2015

Related U.S. Application Data

(63) Continuation of application No. PCT/JP2013/000785, filed on Feb. 13, 2013.

(30) Foreign Application Priority Data

Jun. 15, 2012 (JP) ................................ 2012-135515

(51) Int. Cl.
*G06K 9/00* (2006.01)
*G06T 7/00* (2017.01)
(Continued)

(52) U.S. Cl.
CPC ........... *G06T 7/0022* (2013.01); *G09G 3/003* (2013.01); *G09G 5/399* (2013.01);
(Continued)

(58) Field of Classification Search
CPC ........ G06T 7/0022; G06T 2207/10021; G09G 3/003; G09G 5/399; G09G 2310/0224;
(Continued)

(56) References Cited

U.S. PATENT DOCUMENTS 6,310,546 B1 * 10/2001 Seta ..................... G07C 5/0891
340/507
6,595,921 B1 * 7/2003 Urbano .................... A61B 8/06
600/437

(Continued)

FOREIGN PATENT DOCUMENTS

EP 2 793 183 * 10/2014 .............. B25J 13/08
EP 2793183 * 10/2014 .............. B25J 13/08
(Continued)

OTHER PUBLICATIONS

International Search Report issued Apr. 16, 2013 in International (PCT) Application No. PCT/JP2013/000785.

*Primary Examiner* — Amara Abdi
(74) *Attorney, Agent, or Firm* — Wenderoth, Lind & Ponack, L.L.P.

(57) ABSTRACT

The application discloses an image data processing device for generating output image data which represents an output image including a first region image to be displayed in a first region and a second region image to be displayed in a second region adjacent to the first region. The image data processing device includes an extractor configured to extract a part of first image data representing a first image as first extraction data representing the first region image and a part of second image data representing a second image to be viewed and compared simultaneously with the first image as second extraction data representing the second region image. The extractor processes the first extraction data and the second extraction data to generate the output image data.

5 Claims, 27 Drawing Sheets

(51) Int. Cl.
*H04N 13/02* (2006.01)
*G09G 3/00* (2006.01)
*G09G 5/399* (2006.01)
*H04N 13/00* (2006.01)
*H04N 17/00* (2006.01)

(52) U.S. Cl.
CPC ..... *H04N 13/0003* (2013.01); *H04N 13/0007* (2013.01); *H04N 13/0025* (2013.01); *H04N 13/0239* (2013.01); *H04N 17/00* (2013.01); *G06T 2207/10021* (2013.01); *G09G 2310/0224* (2013.01); *G09G 2354/00* (2013.01); *H04N 2013/0081* (2013.01)

(58) Field of Classification Search
CPC ........... G09G 2354/00; H04N 13/0003; H04N 13/0007; H04N 13/0025; H04N 13/0239; H04N 17/00; H04N 2013/0081
See application file for complete search history.

(56) References Cited

U.S. PATENT DOCUMENTS

| | | | | |
|---|---|---|---|---|
| 6,940,646 | B2* | 9/2005 | Taniguchi | G02B 27/2214 348/54 |
| 2003/0069695 | A1* | 4/2003 | Imanishi | B60R 1/00 701/301 |
| 2011/0007132 | A1* | 1/2011 | Redmann | G03B 35/18 348/42 |
| 2011/0018968 | A1* | 1/2011 | Shikata | H04N 5/23293 348/47 |
| 2011/0242282 | A1* | 10/2011 | Arai | H04N 13/0025 348/46 |
| 2012/0139900 | A1* | 6/2012 | Matsui | H04N 13/0029 345/419 |
| 2013/0156338 | A1* | 6/2013 | Yamazaki | H04N 13/0022 382/264 |
| 2013/0201302 | A1* | 8/2013 | Shikata | H04N 5/23293 348/50 |

FOREIGN PATENT DOCUMENTS

| | | | |
|---|---|---|---|
| JP | 9-116860 | 5/1997 | |
| JP | 2004-129186 | * 4/2004 | ............... H04N 13/00 |
| JP | 2010-87793 | 4/2010 | |
| JP | 2011-24151 | 2/2011 | |
| JP | 2011-158777 | 8/2011 | |
| JP | 2011-223100 | 11/2011 | |
| JP | 2012-075001 | * 4/2012 | |

* cited by examiner (FIRST IMAGE)

(SECOND IMAGE)

(FIRST IMAGE)

(SECOND IMAGE)

FIG. 5A

FDT

| FDR1 |
| FDR2 |
| FDR1 |
| FDR2 |
| FDR1 |
| FDR2 |
| FDR1 |
| FDR2 |
| FDR1 |
| FDR2 |
| FDR1 |
| FDR2 |
| FDR1 |
| FDR2 |
| FDR1 |
| FDR2 |
| FDR1 |
| FDR2 |

FIG. 5B

SDT

| SDR1 |
| SDR2 |
| SDR1 |
| SDR2 |
| SDR1 |
| SDR2 |
| SDR1 |
| SDR2 |
| SDR1 |
| SDR2 |
| SDR1 |
| SDR2 |
| SDR1 |
| SDR2 |
| SDR1 |
| SDR2 |
| SDR1 |
| SDR2 |

FIG. 6

OID

| FDR1 |
|------|
| SDR2 |
| FDR1 |
| SDR2 |
| FDR1 |
| SDR2 |
| FDR1 |
| SDR2 |
| FDR1 |
| SDR2 |
| FDR1 |
| SDR2 |
| FDR1 |
| SDR2 |
| FDR1 |
| SDR2 |
| FDR1 |
| SDR2 |

(OUTPUT IMAGE)

(DATA REGIONS)

(BOUNDARY LINE IMAGE)

(IDENTIFICATION IMAGE)

(IDENTIFICATION PATTERN)

(BEFORE SURGERY)

(AFTER SURGERY)

IMAGE-DATA PROCESSING DEVICE AND IMAGE-DATA PROCESSING METHOD

TECHNICAL FIELD

The present invention relates to techniques for generating output image data from two or more types of image data.

BACKGROUND ART

Generally, a stereoscopic image is expressed with use of a left image to be viewed by the left eye and a right image to be viewed by the right eye (c.f. Patent Document 1). The magnitude of a positional deviation of an object or a background between the left and right images is very influential in quality of the stereoscopic image. If there is an excessively large positional deviation of an object or a background between left and right images, a viewer may feel the object or the background too stereoscopic. If there is an excessively small positional deviation of an object or a background between left and right images, a viewer may fail to perceive a stereoscopic image. Therefore, it is important for an editor creating a stereoscopic image to adjust the magnitude of a positional deviation of an object or a background between left and right images.

Comparing two or more types of images, in which an object is represented, makes it easy to know a change of the object over time. For instance, a color change over time or a change in visual characteristics before and after a treatment such as a surgery may be clearly grasped by comparison of two or more types of images.

As described above, it is possible to obtain a variety of visual information by comparison of two or more types of images. Under current circumstances, however, there are no techniques for easily comparing two or more types of images. For instance adjustment to a magnitude of a positional deviation of an object or a background between left and right images is very dependent on skill of editors.

Patent Document 1: JP 2011-158777 A

SUMMARY INVENTION

An object of the present invention is to provide techniques for easily comparing two or more types of images.

An image data processing device according to one aspect of the present invention generates output image data which represents an output image including a first region image to be displayed in a first region and a second region image to be displayed in a second region adjacent to the first region. The image data processing device includes an extractor configured to extract a part of first image data representing a first image as first extraction data, which represents the first region image, and a part of second image data representing a second image to be viewed and compared simultaneously with the first image as second extraction data representing the second region image. The extractor processes the first extraction data and the second extraction data to generate the output image data.

An image data processing method according to another aspect of the present invention is used for generating output image data, which represents an output image including a first region image to be displayed in a first region and a second region image to be displayed in a second region adjacent to the first region. The image data processing method includes steps of extracting a part of first image data representing a first image as first extraction data, which represents the first region image, and a part of second image data representing a second image to be viewed and compared simultaneously with the first image as second extraction data representing the second region image; and generating the output image data from the first extraction data and the second extraction data.

The present invention allows for a user to easily compare two or more types images.

These and other objects, features and advantages of the present invention will become more apparent upon reading the following detailed description along with the accompanying drawings.

BRIEF DESCRIPTION OF DRAWINGS

FIG. 5A is a conceptual view of first image data representing the first image shown in FIG. 4A;

FIG. 5B is a conceptual view of second image data representing the second image shown in FIG. 4B;

FIG. 6 is a conceptual view of output image data to be generated by the data processing system shown in FIG. 1;

DESCRIPTION OF EMBODIMENTS

Figure 1:
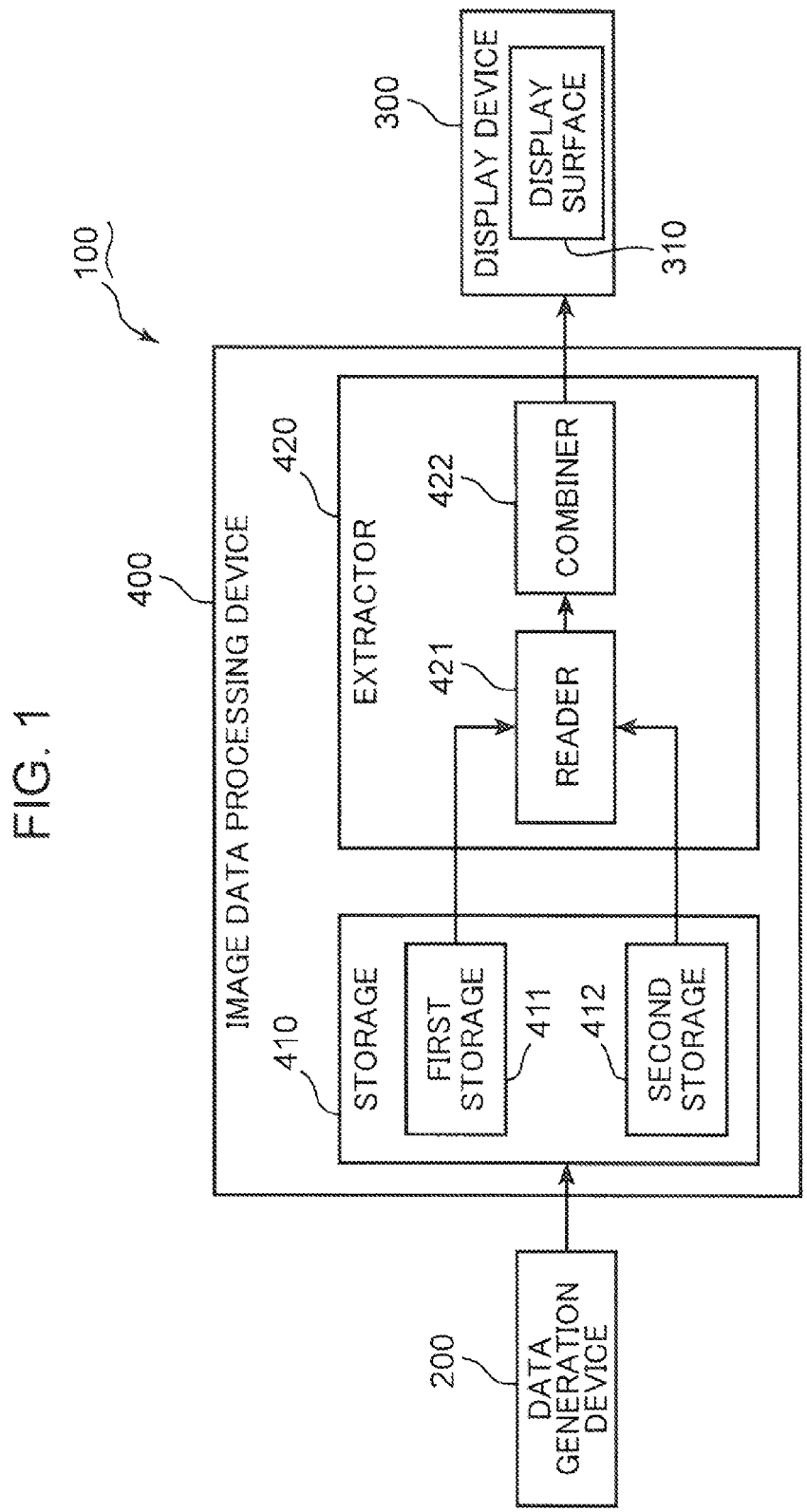
FIG. 1 is a schematic block diagram showing a functional configuration of an exemplary data processing system.

Exemplary techniques for processing image data are described with reference to the drawings. In the following embodiment, similar or identical components are indicated with the same reference signs. To clarify concepts of data processing techniques, repetitive descriptions about the same components are omitted as appropriate. Configurations, arrangements or shapes shown in the drawings and descriptions about the drawings are provided for making principles of the embodiment easily understood. The principles of the embodiment are not limited to them.

(Data Processing System)

FIG. 1 is a schematic block diagram showing a functional configuration of an exemplary data processing system 100. The data processing system 100 is described with reference to FIG. 1.

The data processing system 100 includes a data generation device 200, a display device 300 and an image data processing device 400. The data generation device 200 generates two or more types of image data. If the data processing system 100 is used for generating a stereoscopic image, the data generation device 200 generates left image data for use in representing a left image to be viewed by the left eye and right image data for use in representing a right image to be viewed by the right eye. If the data processing system 100 is used for acquiring information about a change in visually perceivable characteristics over time, the data generation device 200 generates image data acquired at different times. The data generation device 200 may be a camera device or another device configured to generate image data a computer). Two or more types of image data are transmitted from the data generation device 200 to the image data processing device 400. The image data processing device 400 may be connected to the data generation device 200 via a cable. In this case, image data is transmitted to the image data processing device 400 via the cable as electrical signals. Alternatively, image data may be transmitted from the data generation device 200 to the image data processing device 400 as wireless signals. The image data processing device 400 combines two or more types of image data to generate output image data. The output image data is transmitted from the image data processing device 400 to the display device 300. The display device 300 includes a display surface 310. The display device 300 displays an output image represented by output image data on the display surface 310. A user may refer the output image displayed on the display surface 310 to simultaneously observe and compare two or more types of image data. The display device 300 may be a dedicated monitor device exclusively used for the data processing system 100. Alternatively, the display device 300 may be a mobile terminal having a display function. Like the data transmission techniques between the data generation device 200 and the image data processing device 400, data transmission from the image data processing device 400 to the display device 300 may rely on a wired system or a wireless system.

The image data processing device 400 includes a storage 410 and an extractor 420. The storage 410 stores the two or more types of image data generated by the data generation device 200. The extractor 420 combines the two or more types of image data to generate output image data. The output image data is transmitted from the extractor 420 to the display device 300.

The storage 410 includes a first storage 411 and a second storage 412. If the data processing system 100 is used for generating a stereoscopic image, the first storage 411 stores one of left and right images whereas the second storage 412 stores the other of the left and right images. If the data processing system 100 is used for acquiring information about a change in visually perceivable characteristics over time, the first storage 411 may store image data acquired at an earlier time whereas the second storage 412 may store image data acquired at a later time. In the following description, image data stored in the first storage 411 is called as "first image data" whereas image data stored in the second storage 412 is called as "second image data".

The storage 410 may be a general storage medium such as a magnetic or optical storage disk or a USB memory. The first and second storages 411, 412 may be different storage domains in a storage medium.

In the embodiment, the data generation device 200 outputs two types of image data to the image data processing device 400. Alternatively, the data generation device may output three or more types of image data to the image data processing device. In this case, the storage in the image data processing device may include three or more types of storage domains (or storage elements).

The extractor 420 includes a reader 421 and a combiner 422. The reader 421 reads out the first image data from the first storage 411. The reader 421 reads out the second image data from the second storage 412. The first image data and the second image data are output from the reader 421 to the combiner 422. The combiner 422 processes the first image data and the second image data to generate output image data. The output image data is output from the combiner 422 to the display device 300.

Figure 2:
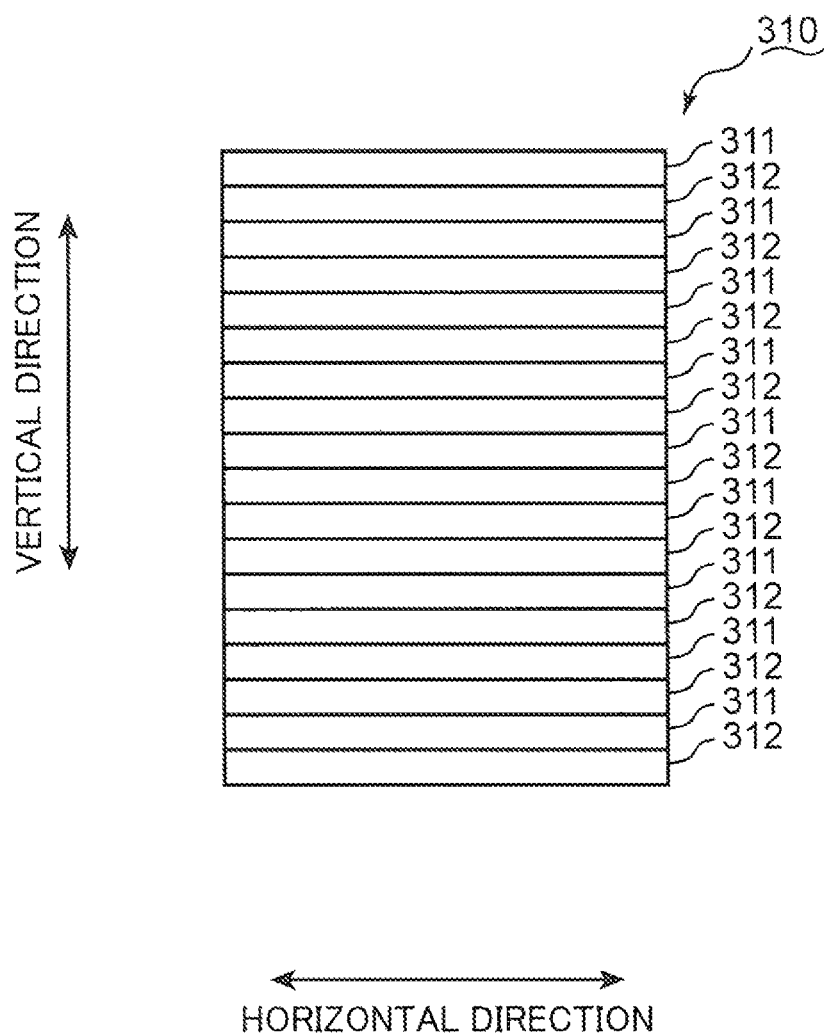
FIG. 2 is a schematic front view of a display surface of the data processing system shown in FIG. 1.

FIG. 2 is a schematic front view of the display surface 310. The display surface 310 is described with reference to FIGS. 1 and 2

The display surface 310 shown in FIG. 2 is conceptually divided into first regions 311 and second regions 312. In the embodiment, the display surface 310 is equally divided. Alternatively, the display surface 310 may be unequally divided.

Each of the first regions 311 is a strip region which extends horizontally. Each of the second regions 312 is also a strip region which extends horizontally. Alternatively, the first and second regions may have another shape. For instance, the first and second regions may be strip regions which extends vertically.

The first and second regions 311, 312 are alternately arranged in the vertical direction. Therefore, each of the second regions 312 is vertically adjacent to each of the first regions 311. If the first and second regions are strip regions which extend vertically, the first and second regions are alternately arranged in the horizontal direction. In this case, each of the second regions is horizontally adjacent to each of the first regions.

As described above with reference to FIG. 1, an output image represented by output image data is entirely displayed on the display surface 310. In the following description, the image to be displayed in the first regions 311 is called as "first region image". The image to be displayed in the second regions 312 is "called as second region image".

Figure 3A:
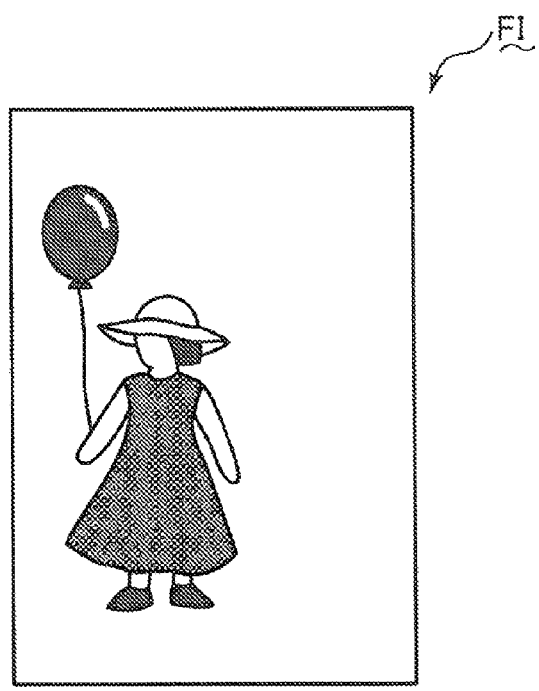
FIG. 3A is a schematic view of an exemplary first image represented by first image data stored in a first storage of the data processing system shown in FIG. 1.
Figure 3B:
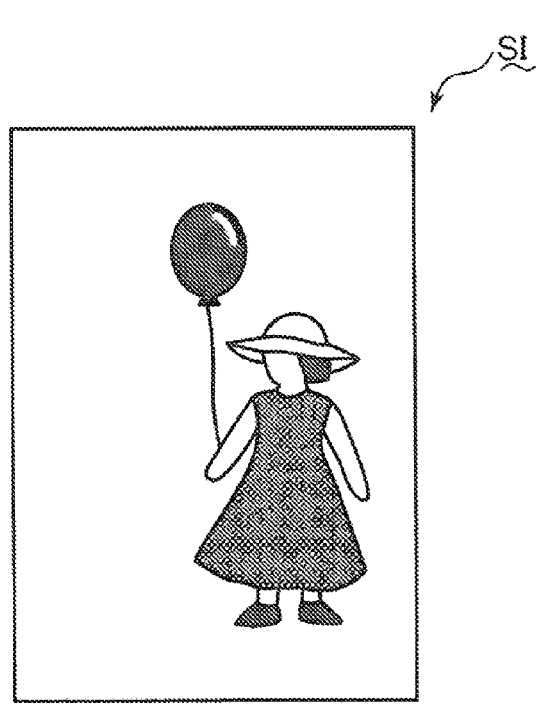
FIG. 3B is a schematic view of an exemplary second image represented by second image data stored in a second storage of the data processing system shown in FIG. 1.

FIG. 3A is a schematic view of an exemplary first image FI represented by the first image data stored in the first storage 411. FIG. 3B is a schematic view of an exemplary second image SI represented by the second image data stored in the second storage 412. The first and second images FI, SI are described with reference to FIGS. 1 to 3B.

The first image FI represented by the first image data may have the same shape and size as those of the display surface 310. Likewise, the second image SI represented by the second image data may have the same shape and size as those of the display surface 310. Therefore, the combiner 422 may process the first image data and the second image data so that the first image data FI and the second image SI are divided in accordance with the region dividing method for the display surface 310 described with reference to FIG. 2.

Figure 4A:
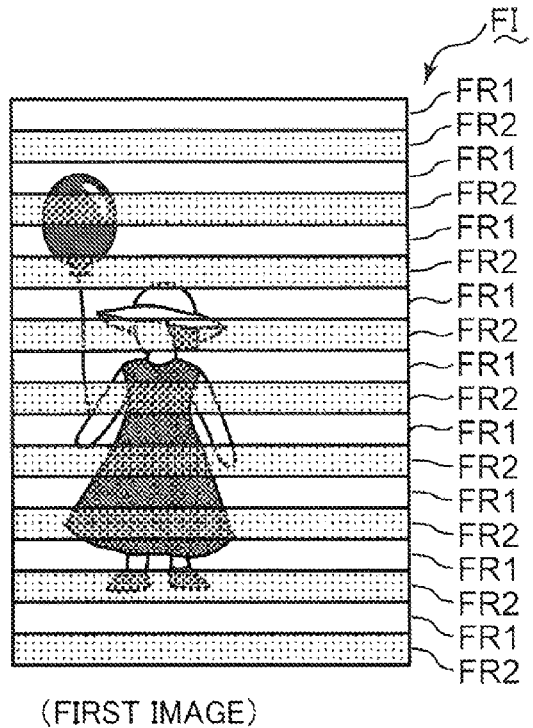
FIG. 4A is a schematic view of the first image shown in FIG. 3A.
Figure 4B:
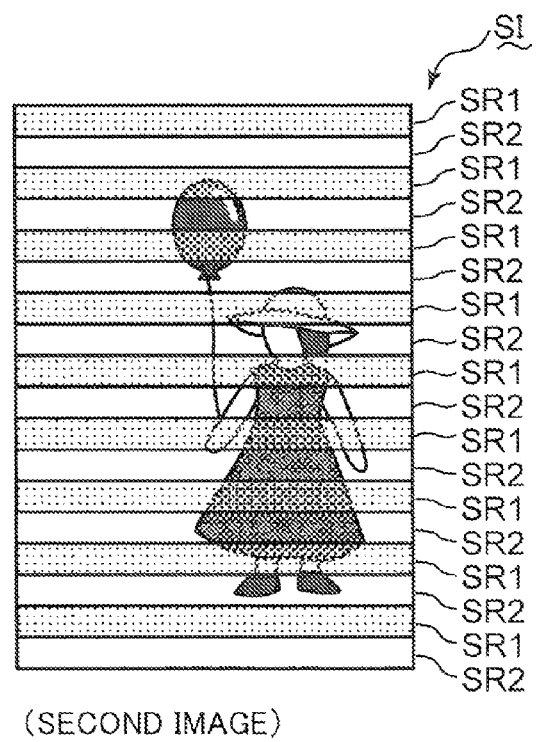
FIG. 4B is a schematic view of the second image shown in FIG. 3B.

FIG. 4A is a schematic view of the first image FI. FIG. 4B is a schematic view of the second image SI. The first and second images FI, SI are further described with reference to FIGS. 2, 4A and 4B.

The first image FI includes regions FR1, which correspond to the first regions 311, respectively, and regions FR2, which correspond to the second regions 312, respectively. When the first image FI is displayed on the display surface 310, image portions in the regions FR1 are displayed in the first regions 311, respectively. When the first image FI is displayed on the display surface 310, image portions in the regions FR2 are displayed in the second regions 312, respectively. In the embodiment, the first corresponding region is exemplified by the region FR1.

In the embodiment, each of the first regions 311 is defined as a strip region which extends horizontally. Therefore, each of the regions FR1 is a strip region which extends horizontally. Each of the second regions 312 is defined as a strip region which extends horizontally. Therefore, each of the regions FR2 is also a strip region which extends horizontally. The shape of each of the regions obtained by the regional division of the first image is determined in accordance with the dividing, method for the display surface. Therefore, when the display surface is divided with use of strip regions which extend vertically, the regions of the first image are also divided with use of strip regions which extend vertically. In this embodiment, the first strip region is exemplified by the region FR1.

The second image SI includes regions SR1, which correspond to the first regions 311, respectively, and regions SR2, which correspond to the second regions 312, respectively. When the second image SI is displayed on the display surface 310, image portions in the regions SR1 are displayed in the first regions 311, respectively. When the second image. SI is displayed on the display surface 310, image portions in the regions SR2 are displayed in the second regions 312, respectively. In the embodiment, the second corresponding region is exemplified by the region SR2.

In this embodiment, each of the first regions 311 is defined as a strip region which extends horizontally. Therefore, each of the regions SR1 is also a strip region which extends horizontally. Each of the second regions 312 is defined as a strip region which extends horizontally. Therefore, each of the regions SR2 is also a strip region which extends horizontally. The shape of each of the regions obtained by the regional division of the second image is determined in accordance with the dividing method for the display surface. Therefore, when the display surface is divided with use of strip regions which extend vertically, the region of the second image is also divided with use of strip regions which extend vertically. In the embodiment, the second strip region is exemplified by the region SR2.

FIG. 5A is a conceptual view of first image data FDT representing the first image FI. FIG. 5B is a conceptual view of second image data SDT representing the second image SI. The first image data FDT and the second image data SDT are described with reference to FIGS. 4A to 5B.

The first image data FDT includes data portions FDR1, which represent an image to be displayed in the regions FR1, and data portions FDR2, which represent an image to be displayed in the regions FR2. The second image data SDT includes data portions SDR1, which represent an image to be displayed in the regions SR1, and data portions SDR2, which represents an image to be displayed in the regions SR2.

FIG. 6 is a conceptual view of output image data OID. Data processes to be executed by the extractor 420 are described with reference to FIGS. 1, 2, 5A to 6.

The reader 421 reads out the first image data FDT from the first storage 411. The reader 421 reads out the second image data SDT from the second storage 412.

The reader 421 extracts the data portions FDR1 from the first image data FDT. The reader 421 extracts the data portions SDR2 from the second image data SDT. The data portions FDR1, SDR2 are output from the reader 421 to the combiner 422. In this embodiment, the first extraction data is exemplified by the data portions FDR1. The second extraction data is exemplified by the data portions SDR2.

The combiner 422 processes the data portions FDR1 as data representing an image to be displayed in the first regions 311. The combiner 422 processes the data portions SDR2 as data representing an image to be displayed in the second regions 312. Consequently, the output image data OID is generated so as to include the data portions FDR1, SDR2.

Figure 7:
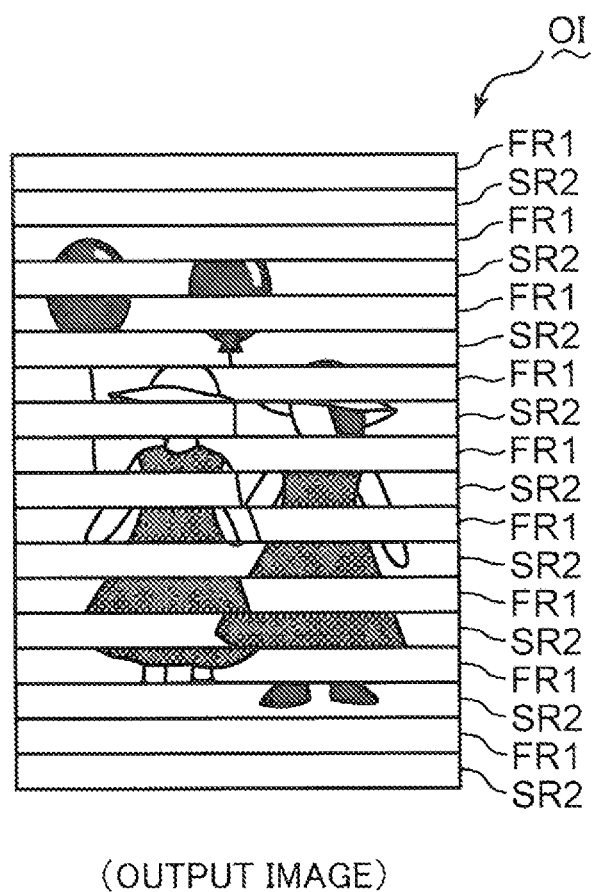
FIG. 7 is a schematic view of an output image represented by the output image data shown in FIG. 6.

FIG. 7 is a schematic view of an output image OI represented by the output image data OID. The output image OI is described with reference to FIGS. 1 to 3B, 6 and 7.

As a result of the combining process by the combiner 422, the output image OI contains the regions FR1, SR2. The regions FR1, SR2 are alternately arranged in the output image OI. The regions FR1 are displayed in the first regions 311. The regions SR2 are displayed in the second regions 312. The regions FR1, SR2 are simultaneously displayed on the display surface 310. Accordingly, a user may easily compare the first image FI with the second image SI. In this embodiment, the regions FR1 are exemplified as the first region image. The regions SR2 are exemplified as the second region image.

Figure 8:
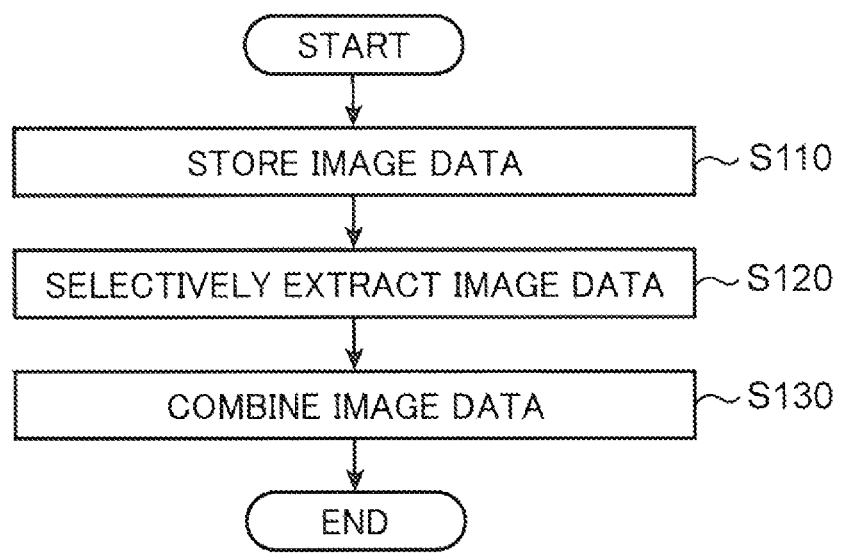
FIG. 8 is a schematic flowchart of data processes to be executed by an image data processing device of the data processing system shown in FIG. 1.

FIG. 8 is a schematic flowchart of data processes to be executed by the image data processing device 400. The data processes to be executed by the image data processing device 400 are described with reference to FIGS. 1 and 8.
(Step S110)

In Step S110, the first storage 411 stores first image data representing a first image. The second storage 412 stores second image data representing a second image. Step S120 is then executed.
(Step S120)

In Step S120, the reader 421 reads out the first image data from the first storage 411. The reader 421 reads out the second image data from the second storage 412. The reader 421 then extracts a part of data from the first image data. The reader 421 extracts a part of data from the second image data. Alternatively, the reader 421 may extract a part of the first image data while reading out the first image data. The reader 421 may extract a part of the second image data while reading out the second image data. The readout process and the extraction process which are executed by the reader 421 do not limit the principles of this embodiment. The extracted data is output from the reader 421 to the combiner 422. Step S130 is then executed.
(Step S130)

In Step S130, the combiner 422 combines the data received from the reader 421 to generate output image data.
(Usage for Creating Stereoscopic Image)

The aforementioned data processing techniques are applicable to creation of a stereoscopic image.

Figure 9:
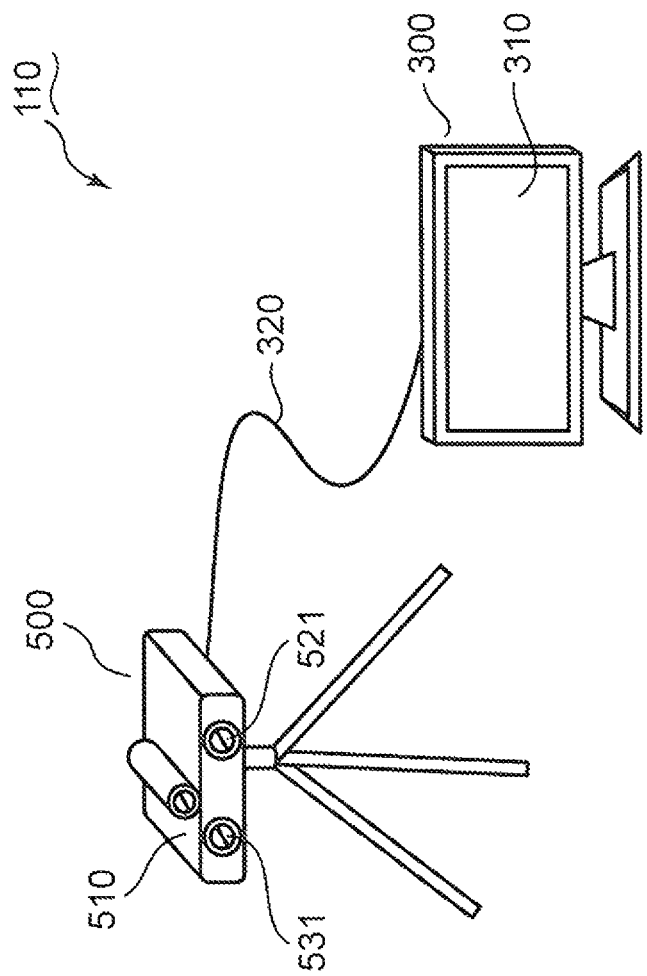
FIG. 9 is a schematic view of an exemplary imaging system.

FIG. 9 is a schematic view of an imaging system 110. The imaging system 110 is described with reference to FIGS. 1 to 3B, 5A to 7 and 9. Similar or identical components as those described with reference to FIG. 1 are indicated with the same reference signs. The description with reference to FIGS. 1 to 8 is applicable to the components indicated with the same reference signs.

The imaging system 110 includes a camera device 500, a display device 300 and a cable 320. The camera device 500 has functions of the data generation device 200 and functions of the image data processing device 400 (c.f. FIG. 1).

The camera device 500 includes a housing 510, a left lens portion 521 and a right lens portion 531. The housing 510 holds the left and right lens portions 521, 531. The left and right lens portions 521, 531 are aligned in the horizontal direction. The camera device 500 uses the left and right lens portions 521, 531 to capture an image of an object O. The camera device 500 may use the left and right lens portions 521, 531 simultaneously to capture an image of the object O. Alternatively, the camera device 500 may use one of the left and right lens portions 521, 531 to capture an image of the object O, and then use the other of the left and right lens portions 521, 531 to capture an image of the object O.

The camera device 500 uses incident light through the left lens portion 521 to generate left image data. The camera device 500 uses incident light through the right lens portion 531 to generate right image data. The left image data is used for generating a left image to be viewed by the left eye. The right image data is used for generating a right image to be viewed by the right eye. The left image data may be processed as the first image data FDT (c.f. FIG. 5A). In this case, the left image is displayed as the first image FI (c.f. FIG. 3A). The right image data may be processed as the second image data SDT (c.f. FIG. 5B). In this case, the right image is displayed as the second image SI (c.f. FIG. 3B).

The housing 510 stores various devices for use in processing the left image data and the right image data. The cable 320 is connected to the camera device 500 and the display device 300. The camera device 500 processes the left image data and the right image data to generate the output image data OID (c.f. FIG. 6). The output image data OID is output from the camera device 500 to the display device 300 via the cable 320.

The display device 300 displays the output image OI on the display surface 310 in response to the output image data OID (c.f. FIG. 7). Consequently, a user may visually grasp a positional difference of the object O between the left and right images. The user may adjust the camera device 500 so that the positional difference of the object O between the left and right images becomes an appropriate value.

The camera device 500 may selectively output the left image data and the right image data to the display device 300 as appropriate. Consequently, a user may individually perform an adjustment operation to the left lens portion 521 and an adjustment operation to the right lens portion 531.

The camera device 500 may alternately repeat an output operation for outputting, all the left image data and an output operation of outputting all the right image data as appropriate. When the aforementioned operations are repeated, the display device 300 may perform a display operation for displaying a left image cm the entire display surface 310 and a display operation of displaying a right image on the entire display surface 310. When a user observes the display surface 310 through an eyewear device configured to open and close in synchronism with switching between these display operations. The user may observe the left image with the left eye and the right image with the right eye. Consequently, the user may stereoscopically perceive a video displayed on the display surface 310. Thus, the user may evaluate quality of the stereoscopic image represented by the left image data and the right image data.

The camera device 500 may alternately switch between a processing operation for processing the left image data as the first image data FDT and the right image data as the second image data SDT and a processing operation for processing the right image data as the first image data FDT and the left image data as the second image data SDT as appropriate. When the camera device 500 performs the processing operation for processing the left image data as the first image data FDT and the right image data as the second image data SDT, the display device 300 displays the left image in the first regions 311 and the right image in the second regions 312 (c.f. FIG. 2). When the camera device 500 performs the processing operation for processing the right image data as the first image data FDT and the left image data as the second image data SDT, the display device 300 displays the right image in the first regions 311 and the left image in the second regions 312 (c.f. FIG. 2). In this case, the display device 300 may give image lights output from the first and second regions 311, 312 optical characteristics different from each other. When an eyewear device worn by a user has an optical element configured to selectively transmit and block light in response to optical characteristics, the user may stereoscopically perceive a video displayed on the display surface 310. Accordingly, the user may evaluate quality of a stereoscopic image represented by the left image data and the right image data.

The camera device 500 may alter the output operation to the display device 300 in accordance with various known techniques for use in allowing a user to stereoscopically perceive a video.

Figure 10:
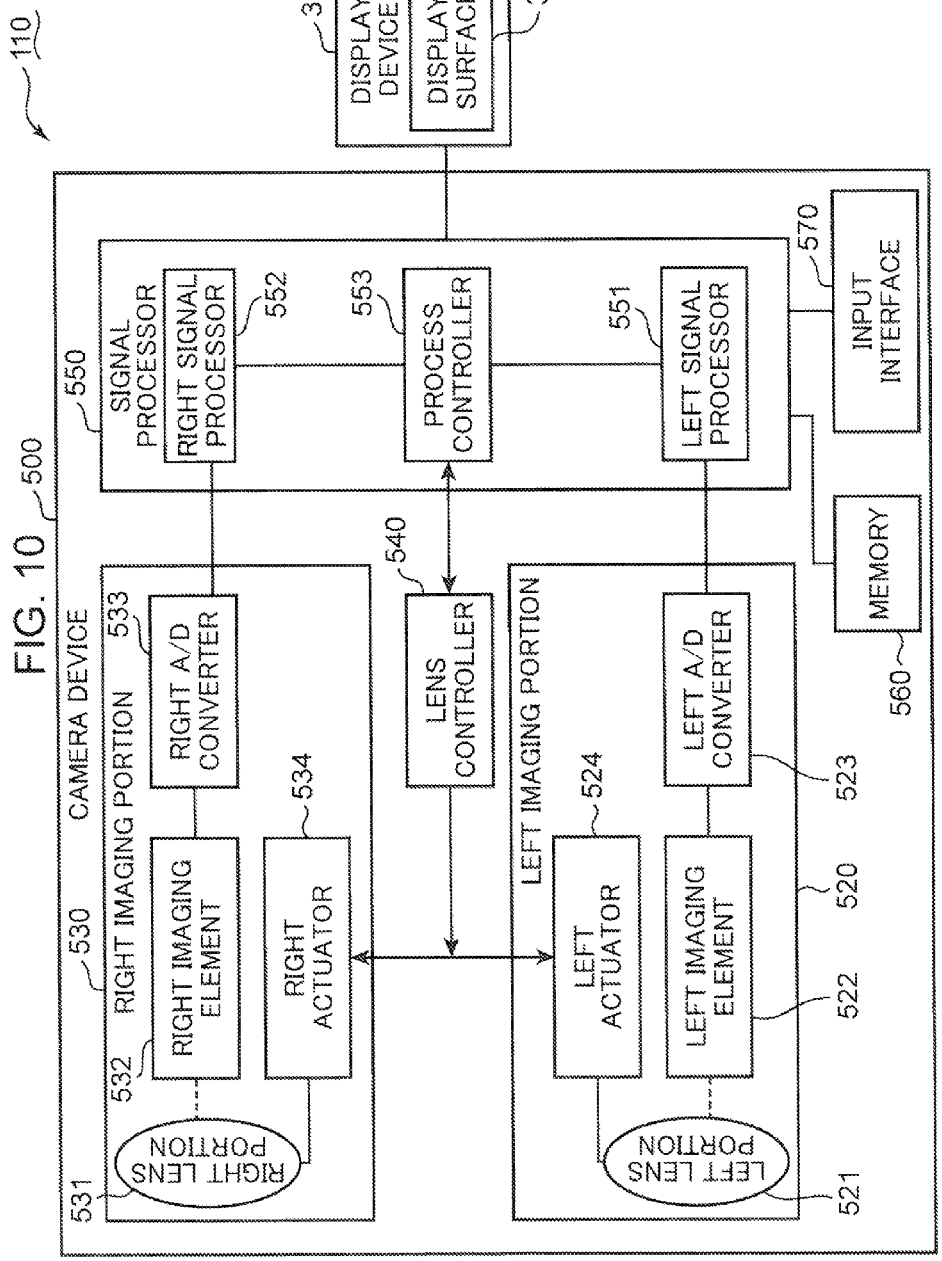
FIG. 10 is a schematic block diagram depicting a hardware configuration of the imaging system shown in FIG. 9.

FIG. 10 is a schematic block diagram showing a hardware configuration of the imaging system 110. The imaging system 110 is further described with reference to FIGS. 1, 9 and 10.

The camera device 500 includes a left imaging portion 520, a right imaging portion 530, a lens controller 540, a signal processor 550, a memory 560 and an input interface 570. The left imaging portion 520 generates left image data. The left image data is output to the signal processor 550, and then stored in the memory 560. The right imaging portion 530 generates right image data. The right image data is output to the signal processor 550, and then stored in the memory 560. The left and right imaging portions 520, 530 correspond to the data generation device 200 (c.f. FIG. 1). The memory 560 corresponds to the storage 410 (c.f. FIG. 1).

The signal processor 550 reads out the left image data and the right image data from the memory 560. The signal processor 550 then combines the left image data and the right image data to generate output image data. The output image data is output from the signal processor 550 to the display device 300. The display device 300 displays an output image on the display surface 310 in response to the output image data.

The input interface 570 may be a keyboard, a mouse, an input button, a remote controller, a touch panel or an external input device connected to the signal processor 550 via a cable. A user may observe an image displayed on the display surface 310, and perform an intended operation for the input interface 570. The input interface 570 outputs operation signals to the signal processor 550 in response to the user's operation. The signal processor 550 may output drive signals for driving the lens controller 540 and/or the display device 300.

The lens controller 540 controls the left and right imaging portions 520, 530 in response to the drive signals from the signal processor 550. Consequently, the imaging system 110 may appropriately create a stereoscopic image.

The left imaging portion 520 includes the left lens portion 521. The left lens portion 521 may be a lens group including two or more lenses. In addition to the left lens portion 521, the left imaging portion 520 includes a left imaging element 522, a left A/D converter 523 and a left actuator 524.

The left actuator 524 moves the left lens portion 521 under control of the lens controller 540. For instance, the left actuator 524 may adjust a distance between the lenses of the left lens portion 521. Consequently, a focal point of light from the object O is appropriately adjusted. A zoom function may be provided by the adjustment to a distance between the lenses of the left lens portion 521. The left actuator 524 may be a motor or another power device configured to drive lenses.

The left imaging element 522 receives light transmitted through the left lens portion 521. The left imaging element 522 then converts the received light energy into electrical energy. Consequently, the light from the object O is converted into electrical signals. The electrical signals are output from the left imaging element 522 to the left A/D converter 523.

The left imaging element 522 outputs analog signals to the left A/D converter 523. The left A/D converter 523 converts the analog signals into digital signals. The digital signals correspond to left image data. The conversion from the analog signals into the digital signals allows for the signal processor 550 to easily process the left image data.

The right imaging portion 530 includes the right lens portion 531. The right lens portion 531 may be a lens group including two or more lenses. In addition to the right lens portion 531, the right imaging portion 530 includes a right imaging element 532, a right A/D converter 533 and a right actuator 534.

The right actuator 534 moves the right lens portion 531 under control of the lens controller 540. For instance, the right actuator 534 may adjust a distance between the lenses of the right lens portion 531. Consequently, the focal point of the light from the object O is appropriately adjusted. A zoom function may be provided by the adjustment to a distance between the lenses of the right lens portion 531. The right actuator 534 may be a motor or another power device configured to drive lenses.

The right imaging element 532 receives light transmitted through the right lens portion 531. The right imaging element 532 then converts the received light energy into electrical energy. Consequently, the light from the object O is converted into electrical signals. The electrical signals are output from the right imaging element 532 to the right A/D converter 531.

The right imaging element 532 outputs analog signals to the right A/D converter 533. The right A/D converter 533 converts the analog signals into digital signals. The digital signals correspond to right image data. The conversion from the analog signals into the digital signals allows for the signal processor 550 to easily process the right image data.

The signal processor 550 includes a left signal processor 551, a right signal processor 552 and a process controller 553. The left and right signal processors 551, 552 are operated under control of the process controller 553.

As described above, the left A/D converter 523 generates digital signals in correspondence to left image data. The digital signals are output from the left A/D converter 523 to the left signal processor 551. The left A/D converter 523 processes the digital signals under control of the process controller 553. When the process controller 553 gives the left signal processor 551 an instruction to increase a luminance level defined by the digital signals, the left signal processor 551 processes the digital signals to increase a luminance level. The process controller 553 may give correction instructions to adjust contrast, hue and intensity of an edge (contour). The left signal processor 551 may perform various signal processes under control of the process controller 553.

As described above, the right A/D converter 533 generates digital signals in correspondence to right image data. The digital signals are output from the right A/D converter 533 to the right signal processor 552. The right A/D converter 533 processes the digital signals under control of the process controller 553. The right signal processor 552 processes the digital signals to increase a luminance level when the process controller 553 gives the right signal processor 552 an instruction to increase a luminance level defined by the digital signals. The process controller 553 may give a correction instruction to adjust contrast, hue and intensity of an edge (contour). The right signal processor 552 may perform various signal processes under control of the process controller 553.

The process controller 553 determines how to process the digital signals which are input to the left and right signal processors 551, 552. The processing contents are notified from the process controller 553 to each of the left and right signal processors 551, 552. Left image data represented by the digital signals, which are processed by the left signal processor 551, and right image data represented by the digital signals, which are processed by the right signal processor 552, are stored in the memory 560. The process controller 553 performs balance control for balancing between the left image data and the right image data, which are stored in the memory 560.

As described above, the display surface 310 displays an output image so that a part of a left image which is represented by left image data and a part of a right image which is represented by right image data are alternately arranged. For instance, a user makes a comparison between left and right images displayed on the display surface 310 to find a positional difference of the object O between the left and right images. At this time. It may be difficult for a user to find a positional difference of the object O between the left and right images if there is a large difference in a luminance level, hue, contrast or edge intensity between the left and right images displayed on the display surface 310. For instance, when one of the left and right images is bright whereas the other of the left and right images is dark, it may be difficult for a user to compare these two images. The aforementioned balance control is executed for the purpose of setting a difference of luminance level, hue, contrast or edge intensity between left and right images displayed on the display surface 310 to an appropriate value.

When a user tries to identify a positional difference of the object O between the left and right images, it may be preferable that there is little difference between digital signals representing regions except for the object O. In this case, the process controller 553 may determine contents of the balance control so that the difference between digital signals representing regions except for the object O becomes small. The left and right signal processors 551, 552 may process digital signals under the balance control of contents determined as described above. The balance control may be executed for the purpose of setting a difference between left and right images to be not larger than a predetermined value in regions except a target region for use in comparison.

The left image data and right image data, which are processed under the balance control, are output from the process controller 553 to the memory 560. The memory 560 stores the left image data and the right image data.

The process controller 553 then reads out the left image data and the right image data from the memory 560. The process controller 553 corresponds to the reader 421 in this aspect (c.f. FIG. 1).

The process controller 553 then extracts a part of the left image data and a part of the right image data. The process controller 553 may process the left image data as the aforementioned first image data. In this case, the process controller 553 processes the right image data as the aforementioned second image data. Alternatively, the process controller 553 may process the right image data as the aforementioned first image data. In this case, the process controller 553 processes the right image, data as the aforementioned second image data.

The process controller 553 combines a part of the left image data and a part of the right image data to generate output image data. The process controller 553 corresponds to the combiner 422 in this aspect (c.f. FIG. 1).

The output image data is output from the process controller 553 to the display device 300. The display device 300 displays an output image in response to the output image data.

Figure 11:
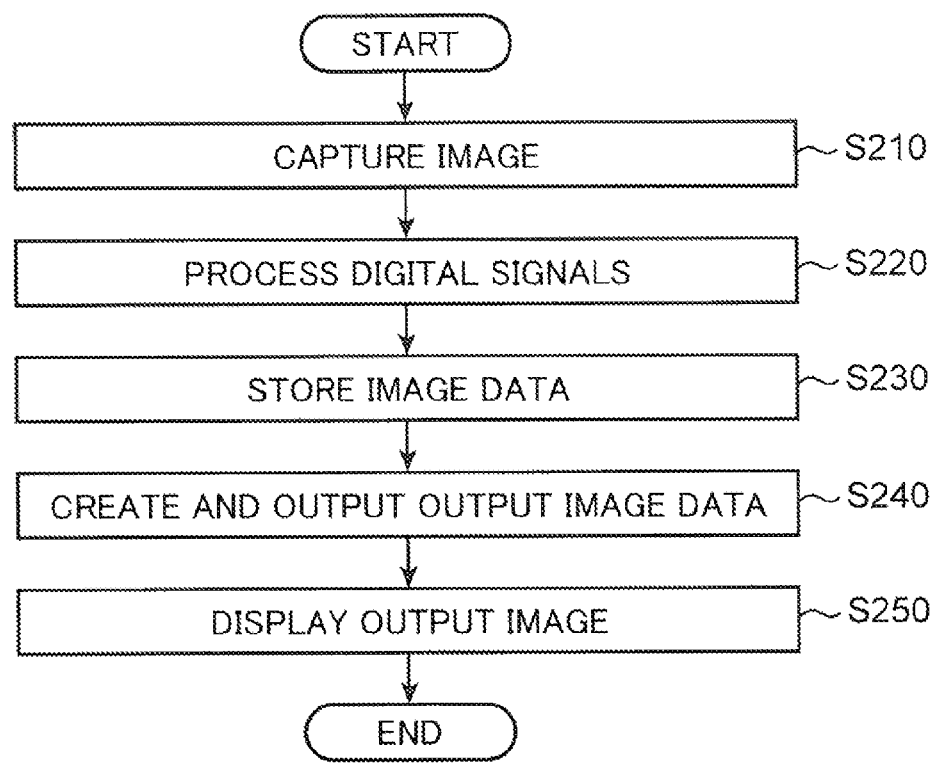
FIG. 11 is a schematic flowchart depicting image processes to be executed by the imaging system shown in FIG. 10.

FIG. 11 is a schematic flowchart showing image processes to be executed by the imaging system 110. The image processes to be executed by the imaging system 110 are described with reference to FIGS. 10 and 11.

(Step S210)

In Step S210, the left and right imaging portions 520, 530 perform imaging operations. Consequently, digital signals for use in generating left image data are output from the left imaging portion 520 to the left signal processor 551. Digital signals for use in generating right image data are output from the right imaging portion 530 to the right signal processor 552. After the digital signals are output. Step S220 is executed.

(Step S220)

In Step S220, the left and right signal processors 551, 552 process the digital signals. The process controller 553 analyzes the digital signals input to the left and right signal processors 551, 552 to determine contents of the balance control. The contents of the balance control are notified to the left and right signal processors 551, 552. The left and right signal processors 551, 552 may execute signal processes under the balance control to be executed by the process controller 553 as described above. After the signal processes. Step S230 is executed.

(Step S230)

In Step S230, the process controller 553 stores the digital signals processed by the left signal processor 551 in the memory 560 as the left image data. The process controller 553 stores the digital signals processed by the right signal processor 552 in the memory 560 as the right image data. After the data is recorded in the memory 560, Step S240 is executed.

(Step S240)

In Step S240, the process controller 553 reads out the left image data and the right image data from the memory 560. The process controller 553 extracts a part of the left image data as image data to be used as a part of the output image data. The process controller 553 extracts a part of the right image data as image data to be used as a part of the output image data. The process controller 553 combines the extracted image data to generate the output image data. After the output image data is generated, Step S250 is executed.

(Step S250)

In Step S250, the output image data is output from the process controller 553 to the display device 300. The display device 300 displays an output image on the display surface 310 in response to the output image data. Consequently, a user may simultaneously observe the left and right images. For instance, the user may perceive a difference between horizontal positions of an object in the left and right images as a parallax amount between the left and right images. When there is a large positional difference of the object between the left and right images, the user may determine that a parallax amount between the left and right images is large. When there is a small positional difference of the object between the left and right images, the user may determine that a parallax amount between the left and right images is small.

The user may appropriately adjust the parallax amount between the left and right images in accordance with the judgment result about the parallax amount as described above. For instance, the user may operate the input interface 570 to adjust the left and right imaging portions 520, 530. The user may adjust the left and right imaging portions 520, 530 so that a parallax amount about a focused object becomes an appropriate value. Alternatively, the user may adjust the left and right imaging portions 520, 530 so as to make an appropriate parallax amount for an entire image to be displayed on the display surface 310. Further alternatively, the user may adjust a distance between the left and right imaging portions 520, 530 or an angle of convergence in order to tune a parallax amount.

The principles of this embodiment make it easy for the user to grasp a parallax amount between left and right images. Consequently, the user may appropriately adjust various settings for easily acquiring left and right images.

Figure 12:
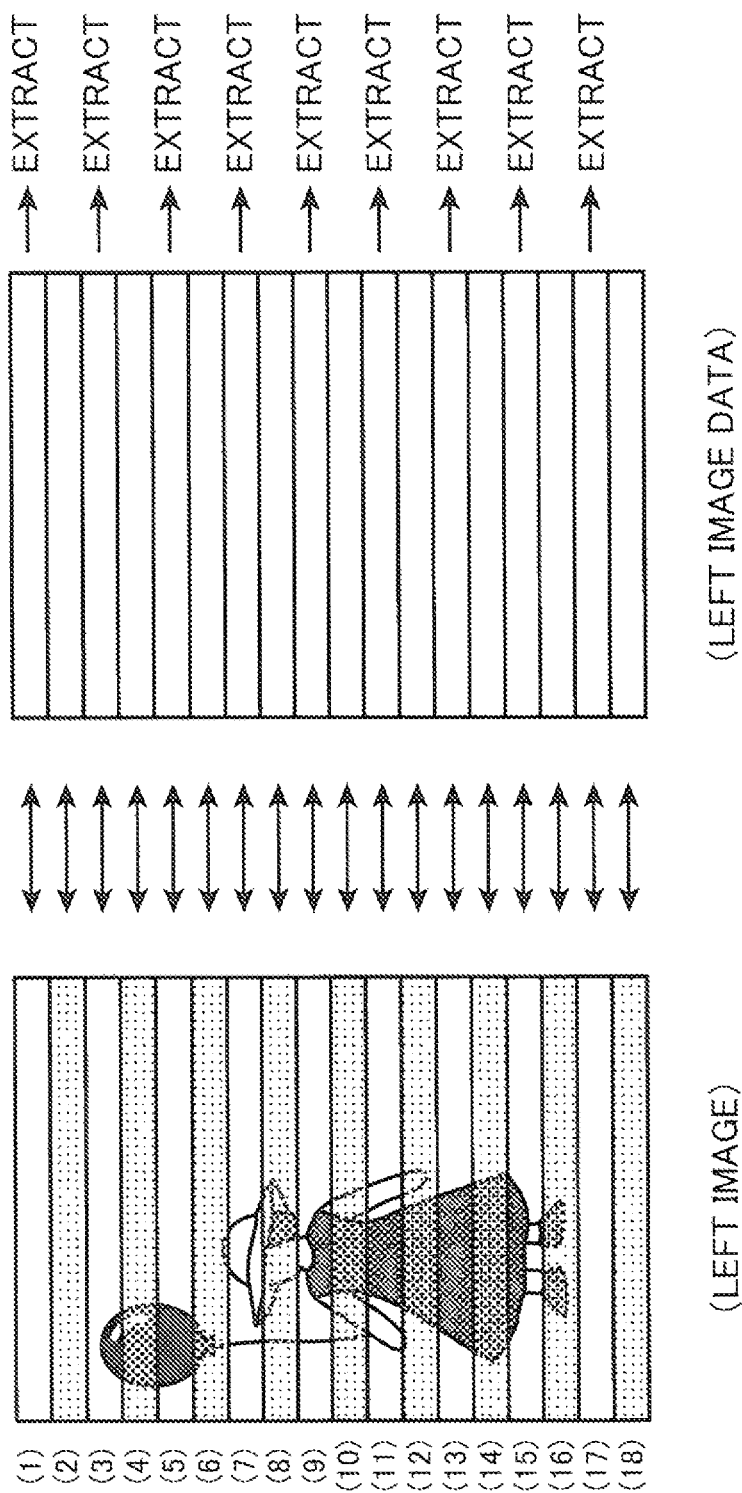
FIG. 12 is a conceptual view of an image data extraction process to be executed by a process controller of the imaging system shown in FIG. 10.

FIG. 12 is a conceptual view of an image data extraction process to be executed by the process controller 553 in Step S240. The image data extraction process to be executed by the process controller 553 is described with reference to FIGS. 10 to 12.

FIG. 12 shows an exemplary left image and left image data in correspondence to the left image. The left image shown in FIG. 12 is conceptually divided into eighteen rectangular regions which extend horizontally. To simplify the description, each of the rectangular regions is numbered in the order from the upper side. The number "1" is attached to the uppermost rectangular region whereas the number "18" is attached to the lowermost rectangular region. The odd-numbered rectangular regions and the even-numbered rectangular regions are alternately aligned in the vertical direction. The left image is represented by the odd-numbered rectangular regions and the even-numbered rectangular regions.

Left image data represents a left image. Accordingly, the process controller 553 may divide the left image data so as to obtain the aforementioned dividing pattern for the left image. In Step S240, the process controller 553 extracts data portions from the left image data to represent an image of the odd-numbered rectangular regions.

Figure 13:
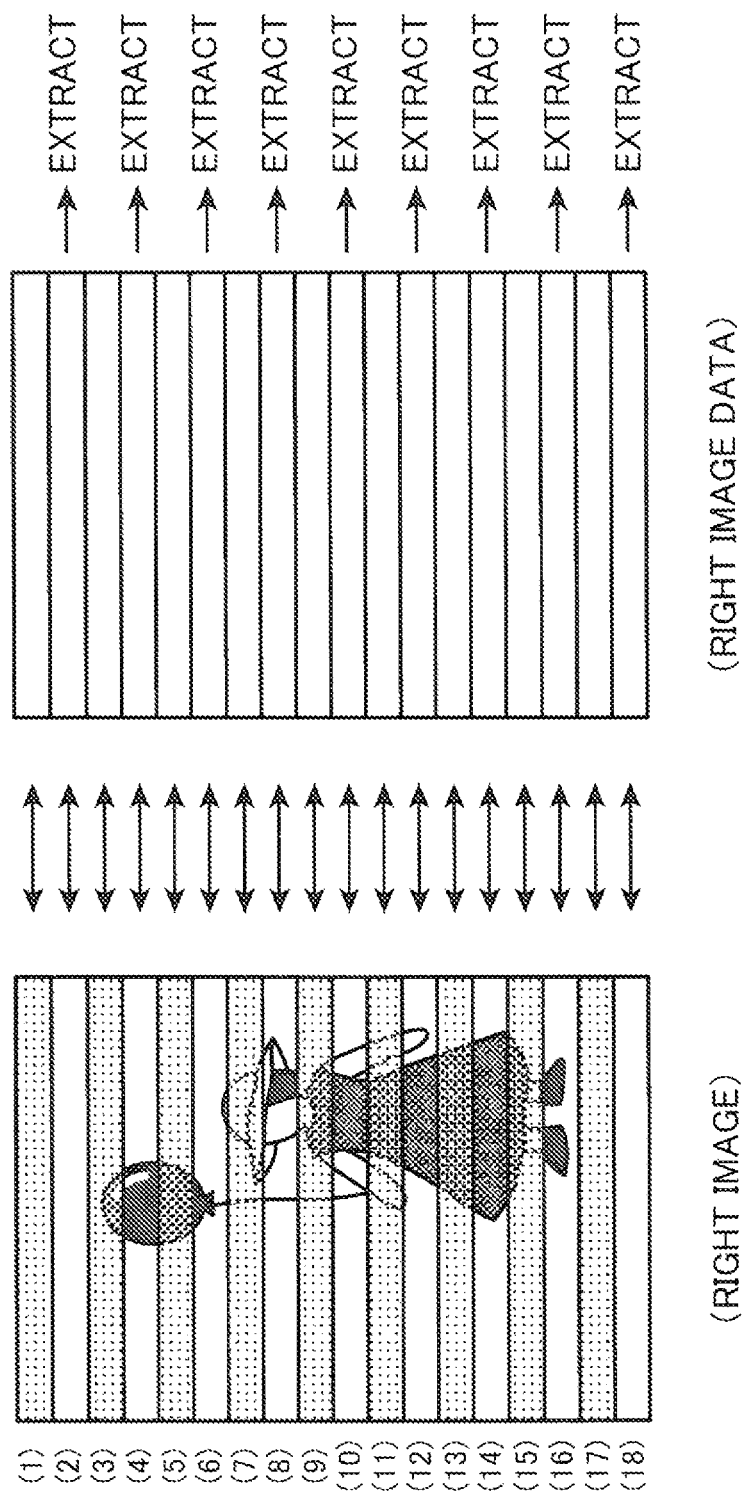
FIG. 13 is a conceptual view of the image data extraction process to be executed by the process controller of the imaging system shown in FIG. 10.

FIG. 13 is a conceptual view of the image data extraction process to be executed by the process controller 553 in Step S240. The image data extraction process to be executed by the process controller 553 is described with reference to FIGS. 10 to 13.

FIG. 13 shows an exemplary right image and right image data in correspondence to the right image. Like the left image described with reference to FIG. 12, the right image shown in FIG. 13 is conceptually divided into eighteen rectangular regions which extend horizontally. To simplify the description, each of the rectangular regions is numbered in the order from the upper side. The number "1" is attached to the uppermost rectangular region whereas the number "18" is attached to the lowermost rectangular region. The odd-numbered rectangular regions and the even-numbered rectangular regions are alternately aligned in the vertical direction. The right image is represented by the odd-numbered rectangular regions and the even-numbered rectangular regions. The dividing pattern for the right image shown in FIG. 13 is the same as the dividing pattern for the left image described with reference to FIG. 12.

Right image data represents a right image. Accordingly, the process controller 553 may divide the right image data so as to obtain the aforementioned dividing pattern for the right image. In Step S240, the process controller 553 extracts data portions from the right image data to represent an image of the even-numbered rectangular regions.

Figure 14:
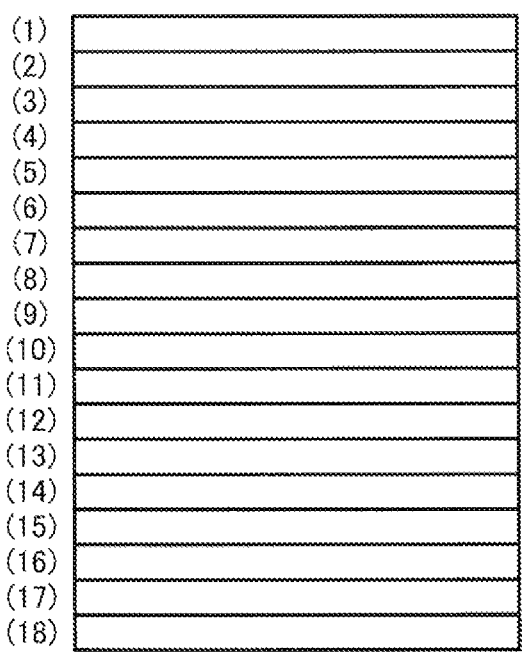
FIG. 14 is a conceptual view of data regions for use in generating an output image to be output from the imaging system shown in FIG. 10.

FIG. 14 is a conceptual view of data regions to be used in generating an output image. The output image data generation process to be executed by the process controller 553 in Step S240 is described with reference to FIGS. 2, 10 to 14.

FIG. 14 conceptually shows eighteen data regions. To simplify the description, each of the data regions is numbered in the order from the upper side. The number "1" is attached to the uppermost data region whereas the number "18" is attached to the lowermost data region.

The odd-numbered data regions are assigned for data representing an image to be displayed in the first regions 311 (c.f. FIG. 2). The even-numbered data regions are assigned for data representing an image to be displayed in the second regions 312 (c.f. FIG. These data regions may be a part of the storage domain of the memory 560.

As described above with reference to FIG. 11, the process controller 553 extracts data portions from the left image data to represent an image of the odd-numbered rectangular regions. The process controller 553 writes the extracted data portions in the odd-numbered data regions.

As described above with reference to FIG. 12, the process controller 553 extracts data portions from the right image data to represent an image of the even-numbered rectangular regions. The process controller 553 writes the extracted data portions in the even-numbered data regions.

Figure 15:
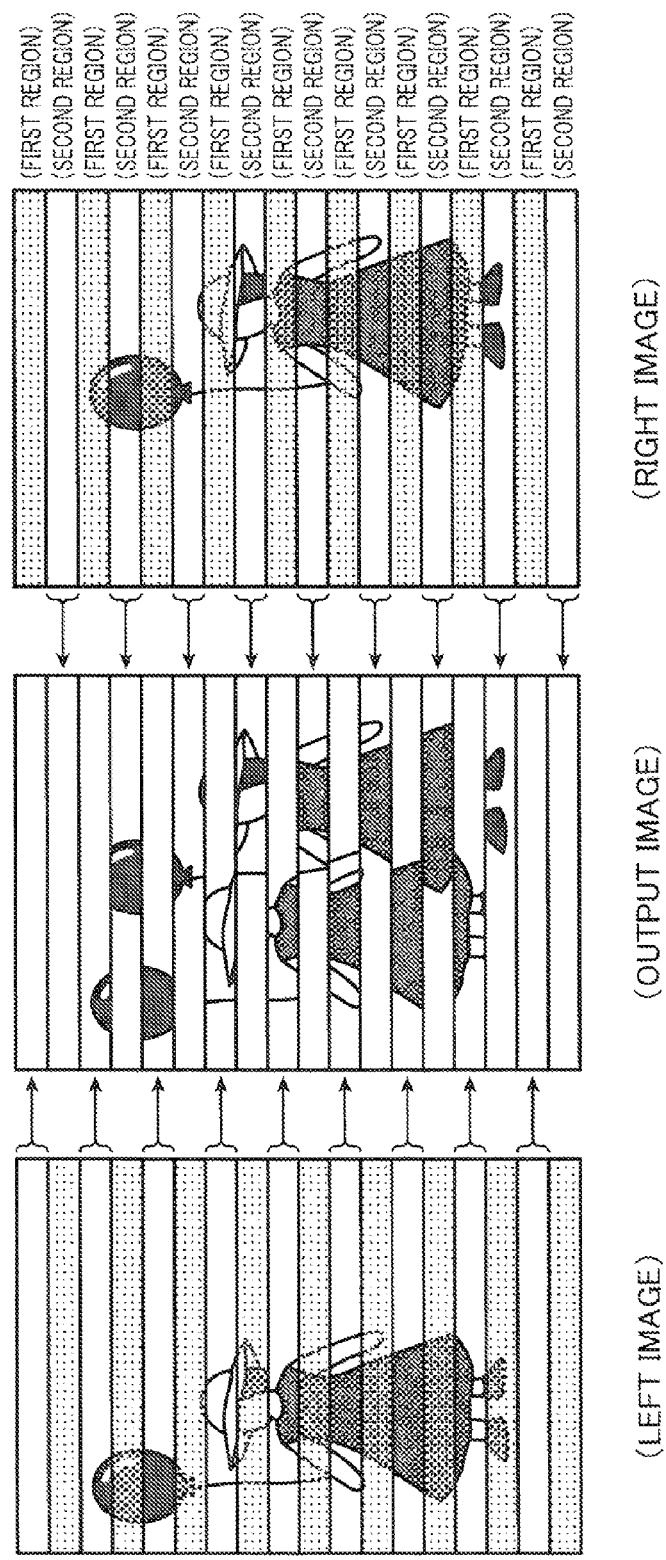
FIG. 15 is a conceptual view of generation processes for the output image data, the generation processes being executed by the process controller of the imaging system shown in FIG. 10.

FIG. 15 is a conceptual view of an output image data generation process to be executed by the process controller 553 in Step S240. The output image data generation process is described with reference to FIGS. 10 and 15.

An image represented by the left image data, which is extracted by the aforementioned writing process of the process controller 553, is displayed in the first regions 331. An image represented by the right image data, which is extracted by the aforementioned writing process of the process controller 553, is displayed in the second regions 332. Consequently, an image in which the rectangular regions representing the left image and the rectangular regions representing the right image are alternately aligned in the vertical direction is displayed on the display surface 310 as the output image.

In this embodiment, rectangular regions, in which a left image is displayed, and rectangular regions, in which a right image is displayed, are alternately set. Alternatively, there may be a region, in which rectangular regions to display a left image are partially continued on the display surface 310. Likewise, there may be a region, in which rectangular regions to display a right image are partially continued on the display surface 310. When a user attempts to check a positional difference in the horizontal direction between left and right images at a specific vertical position, the process controller 553 may execute the image data extraction process so that a boundary between the left and right images appears at the specific vertical position.

In this embodiment, the display surface 310 is equally divided. Alternatively, the process controller 553 may execute the image data extraction process so that the display surface 310 is unequally divided conceptually.

Figure 16:
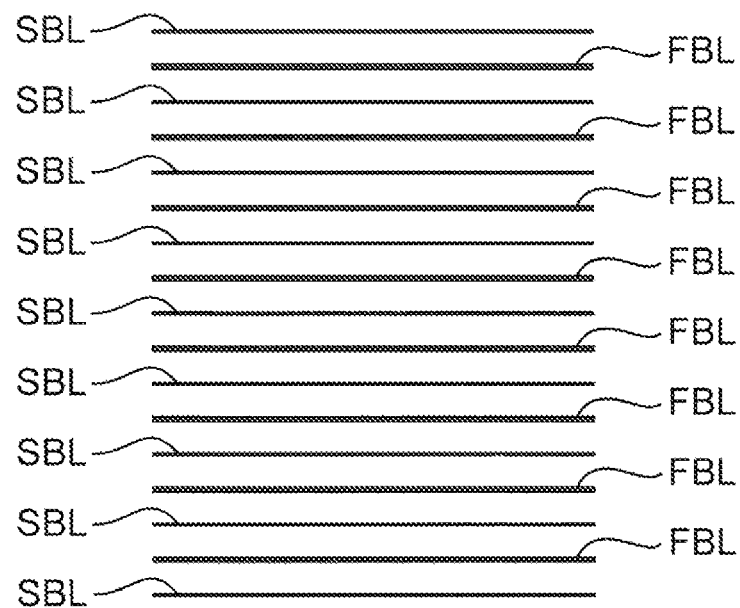
FIG. 16 is a conceptual view of an exemplary boundary line image represented by boundary data, which is incorporated into the output image data by the process controller of the imaging system shown in FIG. 10.

FIG. 16 is a conceptual view of an exemplary boundary line image represented by boundary data, which is incorporated into the output image data by the process controller 553. The boundary line image is described with reference to FIGS. 10, 14 and 16.

As described above, a user may observe an output image, and grasp a parallax amount between left and right images. If a boundary between the left and right images is displayed in the output image, the user may easily grasp the parallax amount. The boundary line image represents a boundary between left and right images.

The boundary line image may include first boundary lines FBL and second boundary lines SBL. In this embodiment, the first boundary lines FBI, are thicker than the second boundary lines SBL. Alternatively, the first boundary lines FBL may be different in hue from the second boundary lines SBL.

When data to be written in the data regions is switched from the right image data to the left image data, the process controller 553 may write data representing the first boundary lines FBI in the data regions. When data to be written in the data regions is switched from the left image data to the right image data, the process controller 553 may write data representing the second boundary lines SBL in the data regions.

Figure 17:
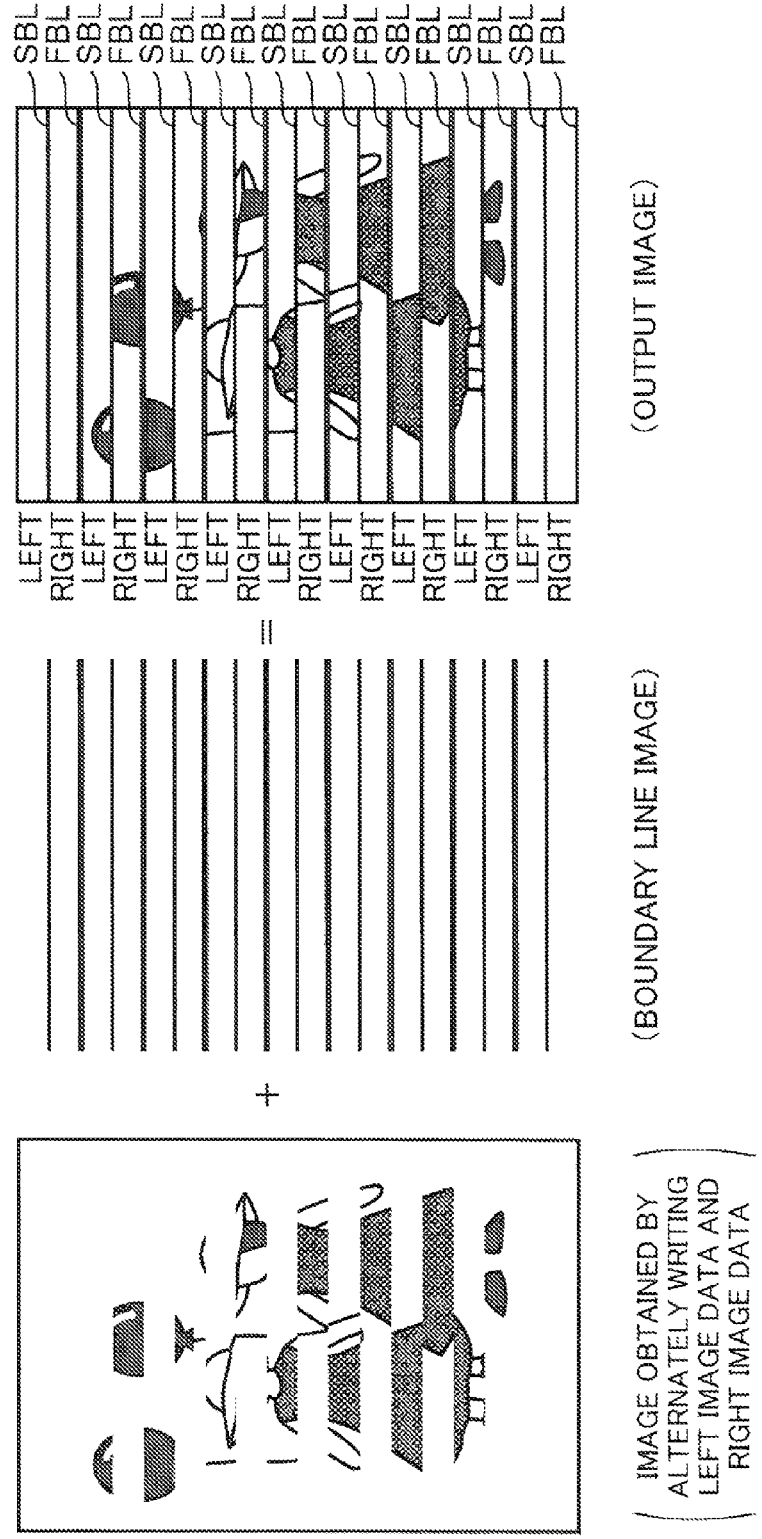
FIG. 17 is a conceptual view of processes for generating an output image which includes the boundary line image shown in FIG. 16.

FIG. 17 is a conceptual view of a process for generating an output image which includes a boundary line image. The output image generation process is described with reference to FIGS. 10 and 17.

As described above, the process controller 553 also writes the boundary data when the left image data and the right image data are written in the data regions. Consequently, the output image contains a boundary line image, in addition to left and right images. A user may identify an image represented in a region below the first boundary line FBL and above the second boundary line SBL as a left image. The user may identify an image represented in a region above the first boundary line FBL and below the second boundary line SBL, as a right image.

In this embodiment, two types of boundary lines are used. Alternatively, one type of boundary lines may be used. In this case, a user may recognize that left and right images are included in a region between boundary lines, and then identify a parallax amount between the left and right images.

Figure 18:
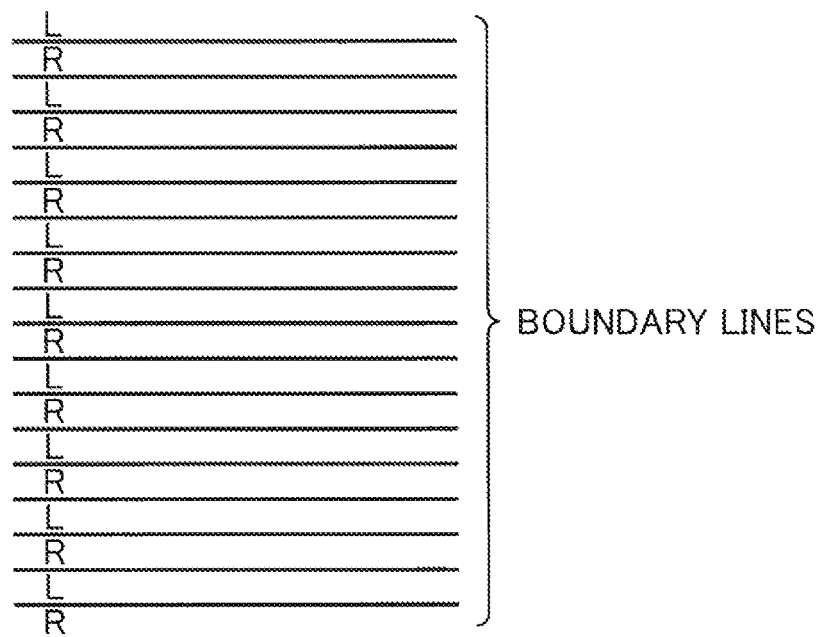
FIG. 18 is a schematic view of an exemplary identification image represented by identification data, which is incorporated into the output image data by the process controller of the imaging system shown in FIG. 10.

FIG. 18 is a schematic view of an exemplary identification image represented by identification data which is incorporated into the output image data by the process controller 553. The identification image is described with reference to FIGS. 10, 16 and 18.

As described above, a user may observe an output image, and identify a parallax amount between left and right images. If identification image representing a left image are displayed in regions in which the left image is displayed, and/or if identification image representing a right image are displayed in regions in which the right image is displayed, the user may easily grasp the parallax amount.

In this embodiment, "L" marks are used as the identification image representing the regions in which a left image is displayed. "R" marks are used as the identification image representing the regions in which a right image is displayed. Alternatively, marks different in shape and/or hue between left and right images may be used as the identification image.

In the embodiment, the first identification image is exemplified by one of the "L" marks and the "R" marks. The second identification image is exemplified by the other of the "L" marks and the "R" marks.

The identification data may be stored in the memory 560. The process controller 553 may read out identification data from the memory 560 to display the "L" marks along with the left image data. The process controller 553 may incorporate the identification data into the left image data to display the "L" marks, and generate an output image. The process controller 553 may read out the identification data from the memory 560 to display the "R" marks along with the right image data. The process controller 553 may incorporate the identification data into the right image data to display the "R" marks and generate an output image.

FIG. 18 shows boundary lines along with the identification image. The boundary lines may be displayed by the techniques described with reference to FIG. 16.

Figure 19:
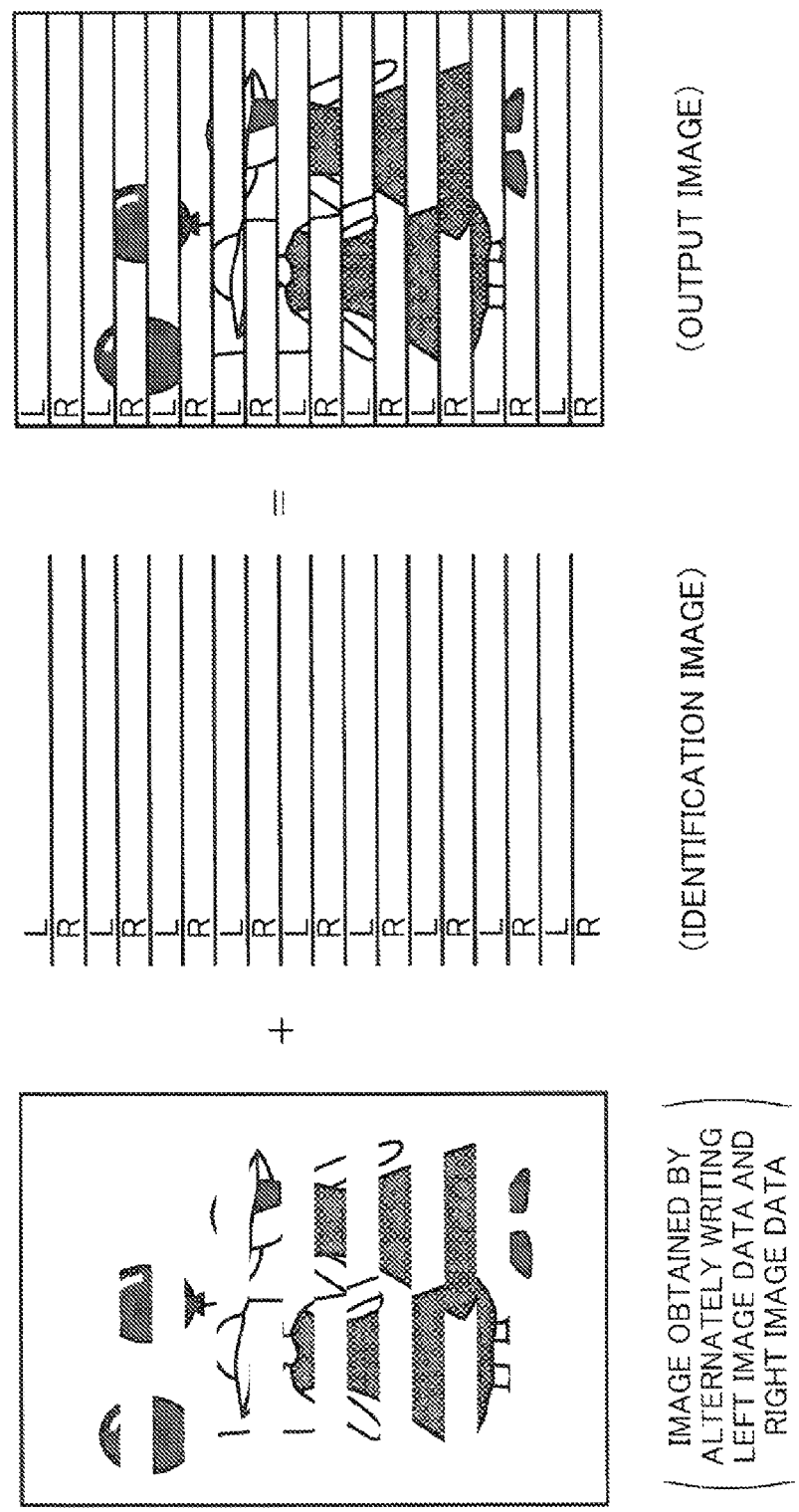
FIG. 19 is a conceptual view of processes for generating an output image, which includes the identification image shown in FIG. 18.

FIG. 19 is a conceptual views of a process for generating an output in age containing an identification image. The output image generation process is described with reference to FIGS. 10 and 19.

As described above, the process controller 553 also writes the identification data when the left image data and the right image data are written in the data regions. Consequently, the output image includes an identification image, in addition to left and right images. A user may identify an image displayed in the regions, in which the "L" marks are displayed, as a left image. The user may identify an image displayed in the regions, in which the "R" marks are, displayed, as a right image.

In this embodiment, two types of the identification image are used. Alternatively, one type of the identification image may be used.

Figure 20:
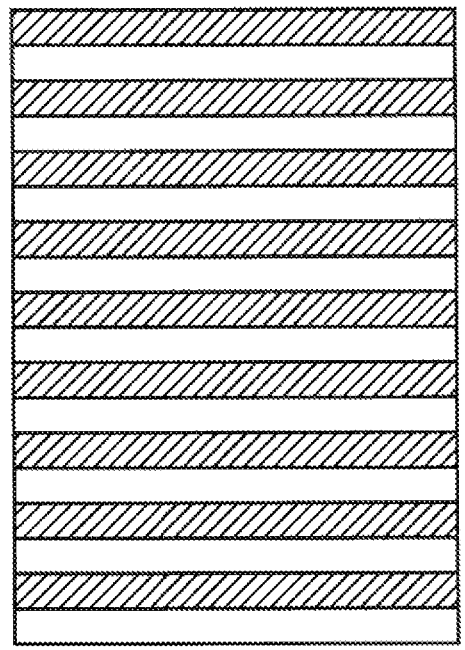
FIG. 20 is a conceptual view of an identification pattern for use in identification between regions, in which a left image is displayed, and regions, in which a right image is displayed.

FIG. 20 is a conceptual view of an identification pattern for use in identification between regions in which a left image is displayed and regions in which a right image is displayed. The identification pattern is described with reference to FIGS. 10 and 20.

As described above, a user may observe an output image and identify a parallax amount between left and right images. When a difference in hue, contrast and/or luminance level is noticeable between the regions, in which a left image is displayed, and the regions, in which a right image displayed, the user may easily grasp a parallax amount.

The process controller 553 may execute processes different from each other in terms of hue, contrast and/or luminance level between left image data and right image data. When the process controller 553 executes a process for intensifying the red hue of left image data, a user may perceive an image, which is entirely tinted in red, as a left image. The process controller 553 generates an identification pattern so that a resultant difference from processes which are different from each other in terms of hue, contrast and/or luminance level between left image data and right image data, causes little interference with comparison between left and right images.

Figure 21:
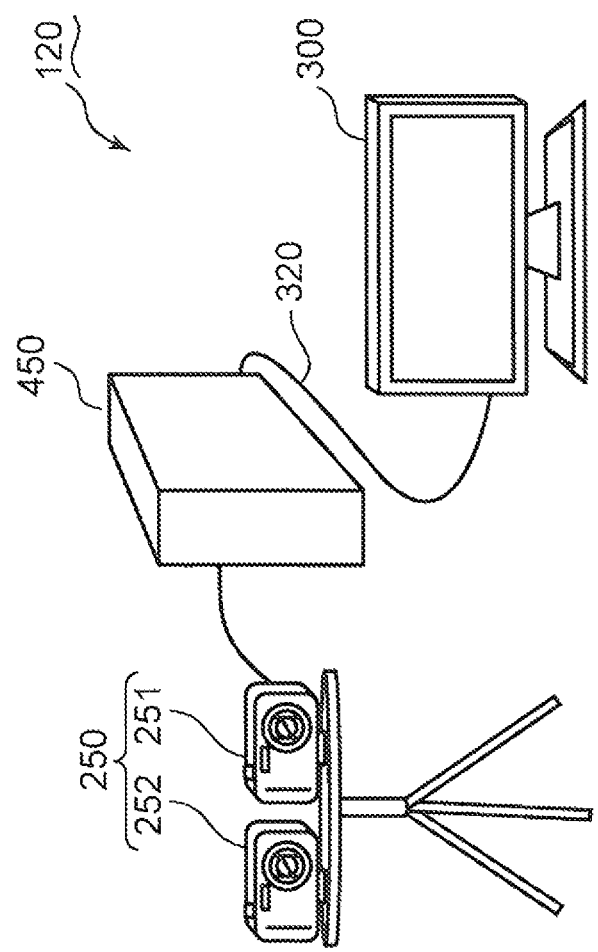
FIG. 21 is a schematic view of another imaging system.

FIG. 21 is a conceptual view of an paging system 120. The imaging system 120 is described with reference to FIGS. 1, 9 and 21. Similar or identical components as those in the description with reference to FIG. 9 are indicated with the same reference signs. The description with reference to FIG. 1 is applicable to the components indicated with the same reference signs.

The imaging system 120 includes a camera device 250, a display device 300, a cable. 320 and a computer device 450. The camera device 250 corresponds to the data generation device 200 described with reference to FIG. 1. The computer device 450 corresponds to the image data processing device 400 described with reference to FIG. 1.

The camera device 250 includes a left camera device 251 and a right camera device 252. The left camera device 251 may have the same hardware configuration as the left imaging portion 520 described with reference to FIG. 10. The right camera device 252 may have the same hardware configuration as the right imaging portion 530 described with reference to FIG. 10.

The computer device 450 may include a lens controller 540, a signal processor 550, a memory 560 and an input interlace 570 (c.f. FIG. 10). Therefore, the imaging system 120 may perform substantially the same operations as the imaging system 110 described with reference to FIG. 10.

Figure 22:
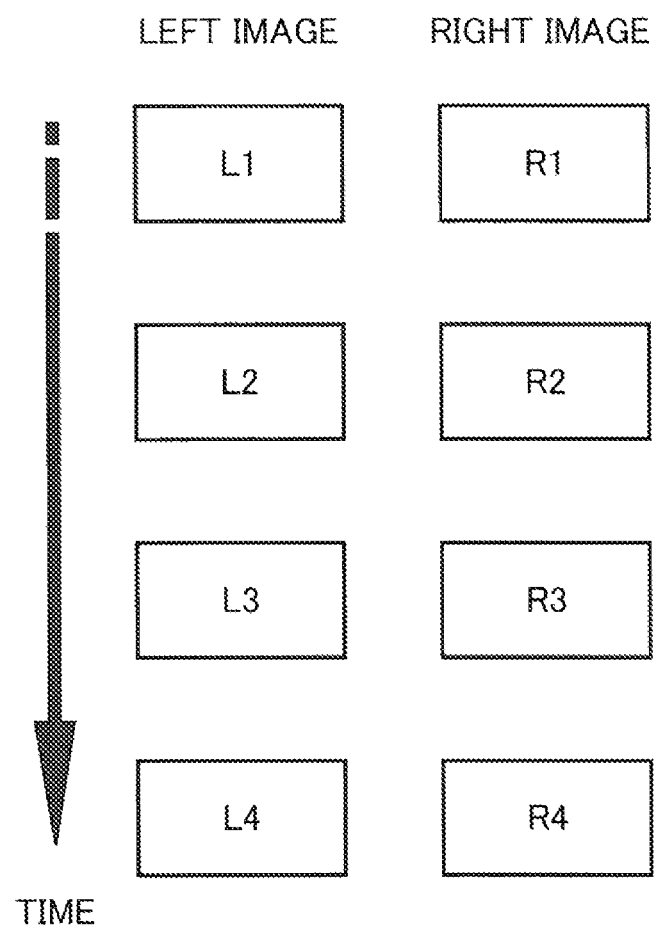
FIG. 22 is a schematic timing chart showing an exemplary imaging timing.

FIG. 22 is a schematic timing chart showing an exemplary imaging timing. The imaging timing is described with reference to FIGS. 10, 21 and 22.

When the left and right imaging portions 520, 530 perform an imaging operation simultaneously, left image data and right image data are acquired at the same time. Likewise, left image data and right image data are acquired at the same time when the left and right imaging portions 251, 252 perform an imaging operation simultaneously. In this case, an image represented by the left image data and the right image data is less likely to contain factors which vary with time. Accordingly, the signal processor 550 may generate an output image from the left image data and the right image data which are acquired at the same time. A user may observe the generated output image, and appropriately find a parallax amount between left and right images.

Figure 23:
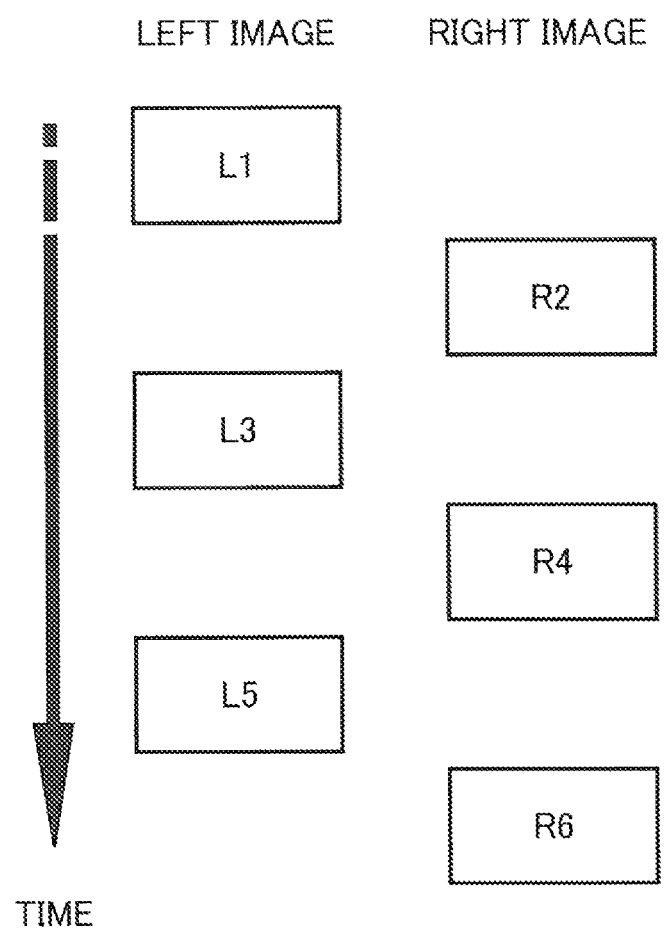
FIG. 23 is a schematic timing chart showing an exemplary imaging timing.

FIG. 23 is a schematic timing chart showing an exemplary imaging timing. The imaging timing is described with reference to FIGS. 10, 21 to 23.

Unlike the timing chart shown in FIG. 22, the timing chart in FIG. 23 shows that the imaging timing of a left image is different from the imaging timing of a right image. For instance, the relationship shown by the timing chart of FIG. 23 is generated when the right camera device 252 performs an imaging operation after signals indicating execution of an imaging operation by the left camera device 251 are output to the right camera device 252. For instance, the acquisition timing of left image data is delayed by the sum of a time period required for outputting signals to the right camera device 252 and a time period required for an imaging operation by the right earners device 252. The delay turns into a difference in acquisition timing between left image data and right image data.

Under the timing relationship shown in FIG. 23, factors which vary with time may be included between the left and right images, in addition to a parallax amount. For instance, when an object moves, visual characteristics such as a position, a posture or a shape of the object may vary with time by an amount in correspondence to a difference in acquisition timing between left image data and right image data.

The signal processor 550 may execute a correction process for reducing a change in visual characteristics with time. For instance, the signal processor 550 may calculate a motion vector from left image data and right image data. The signal processor 550 may use the motion vector to interpolate an image at a pseudo-timeline position in correspondence to the same time. The signal processor 550 may use image data obtained by the interpolation process to generate the aforementioned output image. Consequently, a user may appropriately identify a parallax amount between left and right images without an influence of change in visual characteristics with time.

Figure 24:
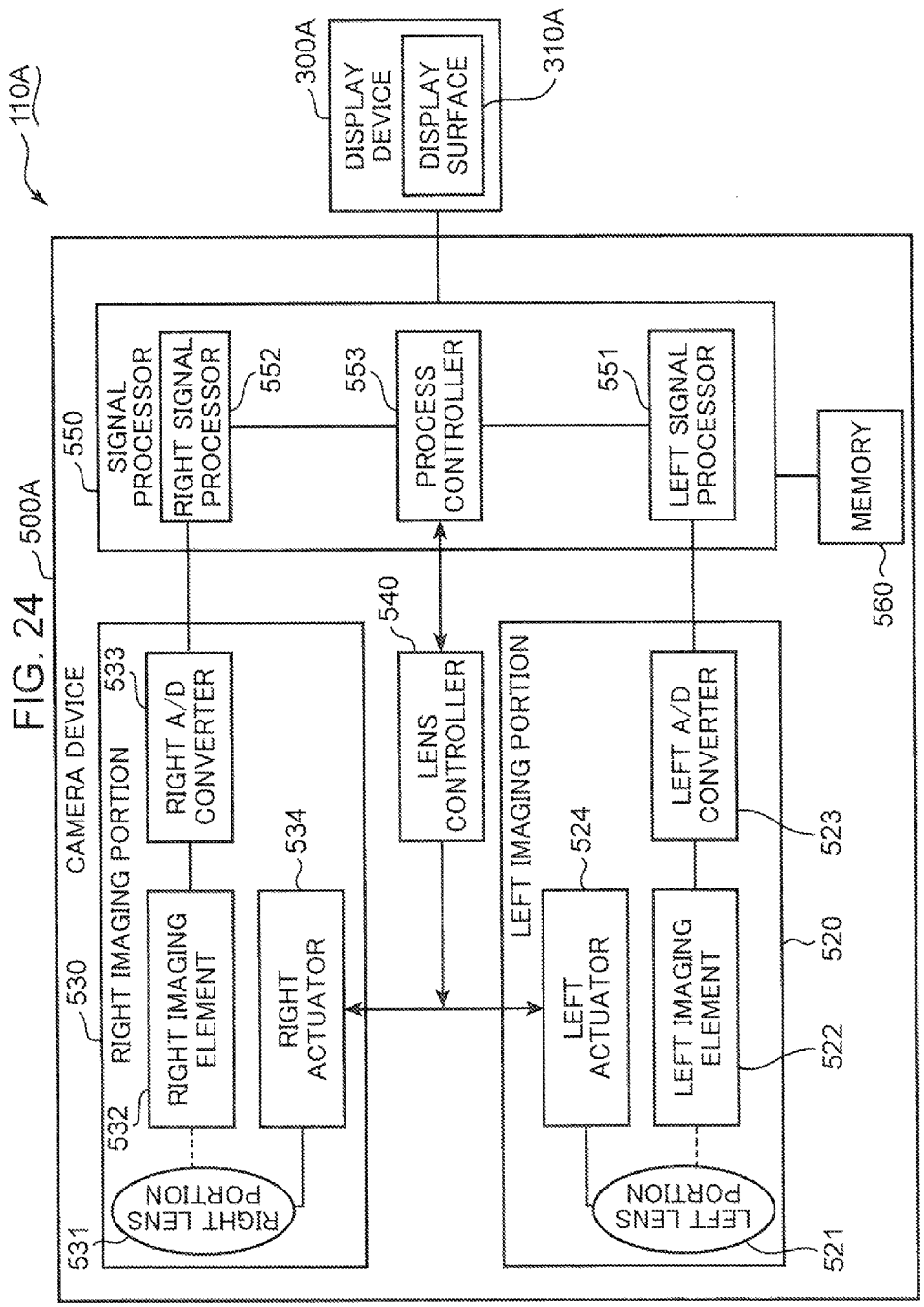
FIG. 24 is a schematic block diagram showing a hardware configuration of another imaging system.

FIG. 24 is a schematic block diagram showing a hardware configuration of an exemplary imaging system 110A. The imaging system 110A is described with reference to FIGS. 10 and 24. Similar or identical components as those described with reference to FIG. 10 are indicated with the same reference signs. The description with reference to FIG. 10 is applicable to the components indicated with the same reference signs.

The imaging system 110A includes a camera device 500A and a display device 300A. Unlike the imaging system 110, the camera device 500A do not include the input interface 570. The imaging system 110A is different from the imaging system 110 in this aspect.

The display device 300A includes a display surface 310A. Like the display surface 310, the display surface 310A has a function of displaying an image. The display surface 310A has a function of the input interface 570, in addition to the display function. In short, a user may operate the imaging system 110A through the display surface 310A.

Figure 25:
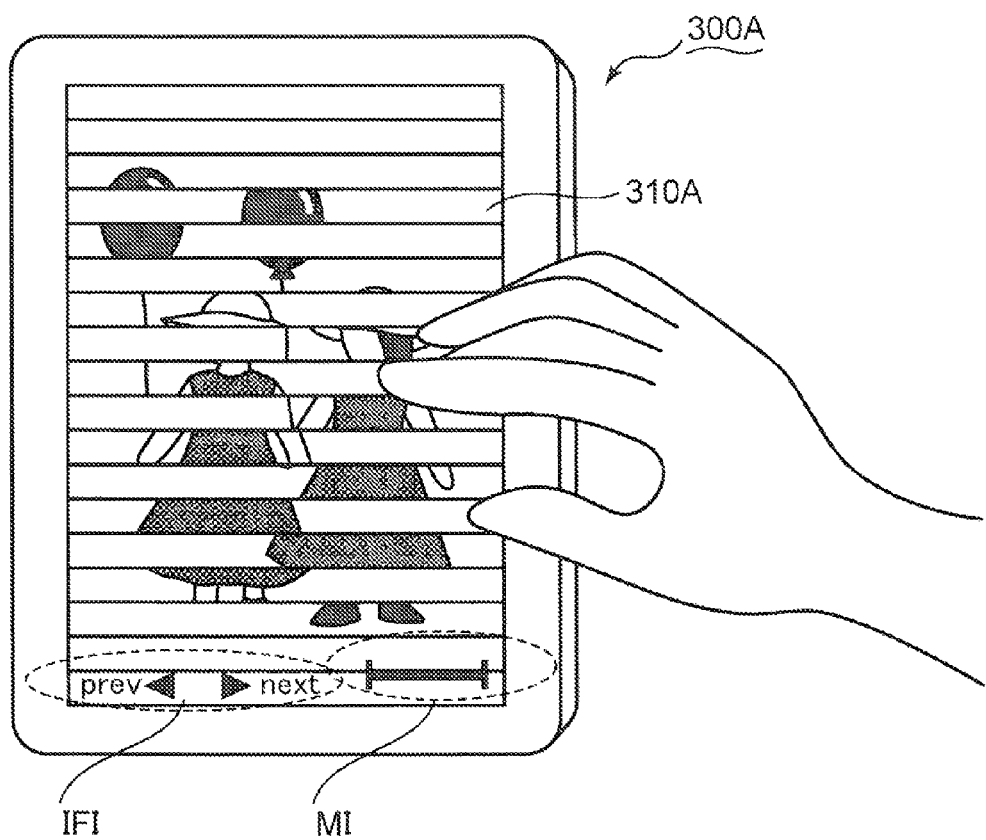
FIG. 25 is a schematic view of a display device of the imaging system shown in FIG.

FIG. 25 is a schematic view of the display device 300A. The imaging system 110A is further described with reference to FIGS. 22 to 25.

An interface image IFI for use in an input operation for an output image or the camera device 500A is displayed on the display surface 310A of the display device 300A shown in FIG. 25, in addition to the aforementioned output image. For instance, a user may operate the interface image IFI to notify the imaging system 110A of a pattern of imaging timing (c.f. FIGS. 22 and 23) implemented by the camera device 500A.

The interface image IFI shown in FIG. 25 includes the characters "prev" and "next". When an output image displayed on the display surface 310A is formed of a left image "L2" and a right image "R2" shown in FIG. 22, and when a user presses the characters "prev", the signal processor 550 may generate an output image from the preceding left image "L1" and the preceding right image "R1". When the user presses the characters "next", the signal processor 550 may generate au output image from the following left image "L3" and the following right image "R3". Accordingly, the principles of this embodiment are applicable to a movie, in addition to a still image.

Interface data representing the interface image IFI may be stored in the memory 560. The signal processor 550 may read out the interface data from the memory 560. The signal processor 550 may incorporate the interface data into the output image data. The interface data may be output to the display device 300A.

A user may use the interface image IFI to perform various operations. For instance, the user may use the interface image IFI to perform adjustment to quality of an output image (e.g. adjustment to luminance, adjustment to contrast, adjustment to edge intensity or color correction). Accordingly, the user may efficiently generate a stereoscopic image.

A user may adjust a vertical size of regions, in which a left image is displayed, and a vertical size of regions, in which a right image is displayed, as appropriate. Consequently, a user may appropriately compare the left image with the right image. For instance, when the user tries to identify a parallax amount of a specific object, the vertical size may be set in accordance with the size of the specific object. When the size of the specific object is large, the user may set a large value fix the vertical size. When the size of the specific object is small, the user may set a small value for the vertical size. For instance, when the specific object is represented by at least one first region and at least one second region, the user may identify a parallax amount about the specific object.

A measurement image MI is displayed on the display surface 310A of the display device 300A shown in FIG. 25, in addition to the interface image IFI. The measurement image MI is used for measuring a deviation amount between left and right images. A user may use the measurement image MI as a ruler to identify a parallax amount between left and right images.

Measurement image data representing the measurement image MI may be stored in the memory 560. The signal processor 550 may read out the measurement image data from the memory 560. The signal processor 550 may incorporate the measurement image data into the output image data. The measurement image data may be output to the display device 300A.

The signal processor 550 may process the measurement image data so that a position of the measurement image MI is changed in response to a user's drag operation when the user performs a drag operation for the measurement image MI. When the user overlaps the measurement image MI on a boundary between left and right images, the user may appropriately grasp a positional difference between the left and right images. Alternatively, the signal processor 550 may process the measurement image data so that the measurement image MI overlaps a boundary between left and right images in advance. Further alternatively, the signal processor 550 may process the measurement image data so that the measurement image MI is displayed near a boundary between left and right images.

The measurement image may represent an appropriate deviation amount between left and right images. When a deviation mount between left and right images is larger than a length indicated by the measurement image, a user may perform an adjustment process of reducing the deviation amount between left and right images. When a deviation amount between left and right images is smaller than a length indicated by the measurement image, a user may perform an adjustment process of increasing the deviation amount between left and right images.

The length indicated by the measurement image may be variable. Accordingly, a user may appropriately set a reference deviation amount in accordance with a generation condition of a stereoscopic image.

The signal processor 550 may have a function of determining whether a deviation amount between left and right images is appropriate, with use of measurement image data representing a measurement image situated on or near a boundary between left and right images and image data around the measurement image. The camera device may have an automatic adjustment function (adjustment function of a zoom position, an angle of convergence, which is an angle between the optical axes of the camera, or a distance between the optical axes) to obtain a predetermined deviation amount (measurement image data).

(Usage for Verifying Effect of Surgery)

The principles of the aforementioned embodiment are applicable to a variety of usage. The aforementioned embodiment is to identify a parallax amount. Generally, the parallax is generated by a positional difference in the horizontal direction between left and right images (i.e. the parallax is likely to be independent from a positional difference in the vertical direction). Accordingly, a display region is divided into rectangular regions which horizontally extend. However, the dividing pattern of the display region depends on technical fields to which the principles of this embodiment are applied. For instance, the display region is divided into vertically extending rectangular regions in order to verify effects of an eyelid incision surgery. The display region may be concentrically divided for other applications. As clearly shown in the aforementioned description, the dividing pattern depends on data extraction from two or more types of image data. Accordingly, if a data extraction method is appropriately set for a certain application, a user may appropriately observe two or more images.

Figure 26A:
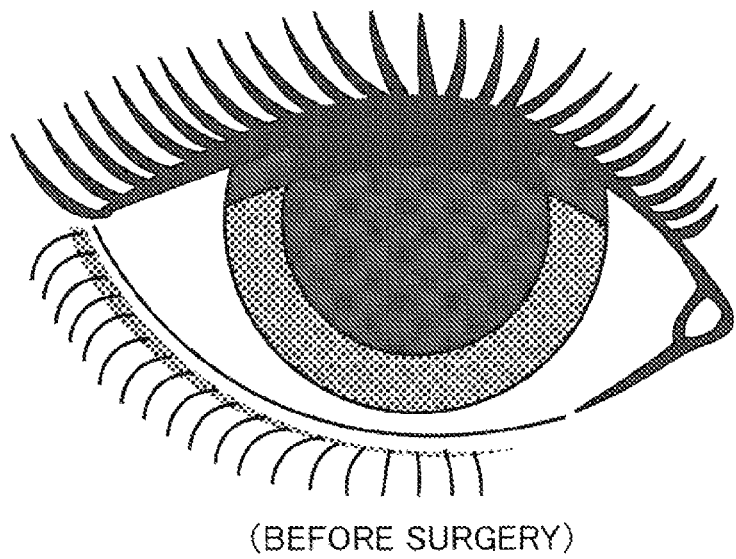
FIG. 26A is an image of an eye photographed before an eyelid incision surgery.
Figure 26B:
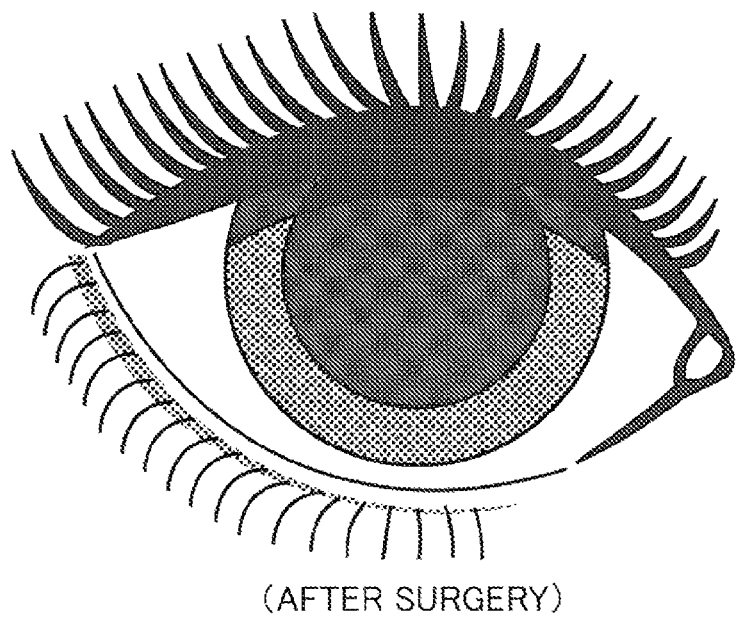
FIG. 26B is an image of the eye photographed after the eyelid incision surgery.

FIG. 26A shows an image of an eye photographed before an eyelid incision surgery. FIG. 26B shows an image of the eye photographed after the eyelid incision surgery.

It may be difficult to verifying effects of the surgery by comparison of the images shown in FIGS. 26A and 26B.

Figure 27:
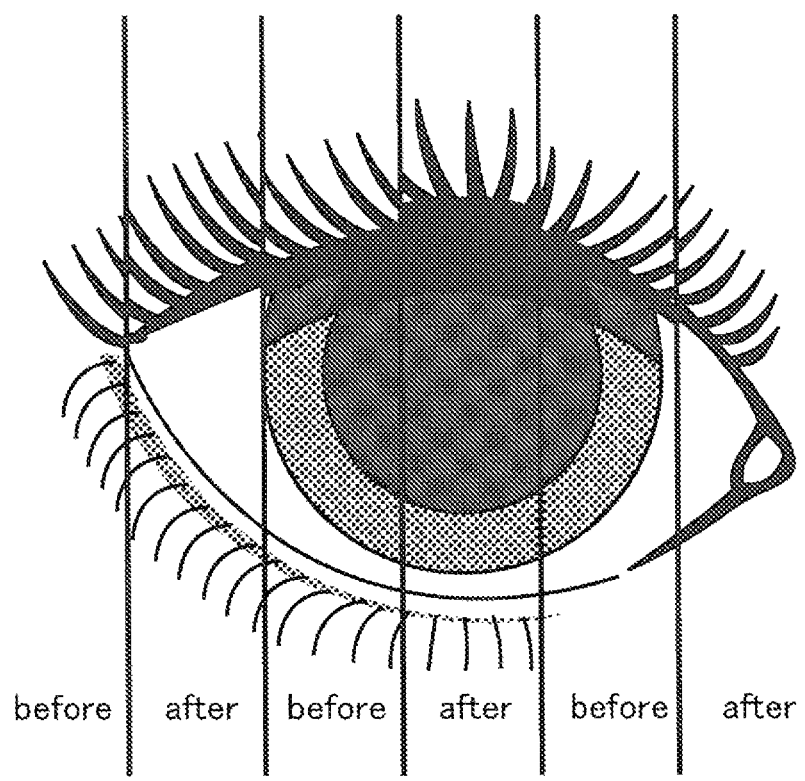
FIG. 27 is an output image generated from the images shown in FIGS. 26A and 26B.

FIG. 27 shows an image generated with use of the aforementioned data processing techniques.

Images of the eye before and after the surgery are horizontally arranged side by side. Accordingly, a user may easily identify a change in a size of the opened eye before and after the surgery. In addition, the user may easily specify a region in which the size of the opened eye is maximally changed.

The data processes shown in FIGS. 8 and 11 may be executed under usage of software. In this case, the extractor 420 (c.f. FIG. 1) or the signal processor 550 (c.f. FIG. 10) may execute a software program running on a CPU, an FPGA or a DSP.

The data processes shown in FIGS. 8 and 11 may be executed under usage of hardware resources such as an integrated element. In this case, the extractor 420 (c.f. FIG. 1) or the signal processor 550 (c.f. FIG. 10) may be an integrated circuit configured to execute the data processes shown in FIGS. 8 and 11.

The image data processing device 400 (c.f. FIG. 1) ma be integrally formed with the display device 300 (c.f. FIG. 1). In this case, the image data processing device 400 has a display function of displaying an image in addition to the data processing function.

The principles of the aforementioned embodiment are also applicable to processes of image data generated by computer graphics techniques, in addition to photographic data. For instance, a parallax amount may be confirmed between left and right images with use of the principles of the embodiment during editing image data.

The various techniques described in the context of the aforementioned embodiment may include the following features.

An image data processing device according to one aspect of the aforementioned embodiment generates output image data representing an output image which includes a first region image to be displayed in a first region and a second region image to be displayed in a second region adjacent to the first region. The image data processing device includes an extractor configured to extract a part of first image data representing a first image as first extraction data, which represents the first region image, and a part of second image data representing a second image to be viewed and compared simultaneously with the first image as second extraction data representing the second region image. The extractor processes the first extraction data and the second extraction data to generate the output image data.

According to the aforementioned configuration, the extractor extracts a part of the first image data representing the first image as the first extraction data, which represents the first region image of the output image. The extractor extracts a part of the second image data, which represents the second image to be viewed and compared simultaneously with the first image, as the second extraction data representing the second region image. The extractor processes the first extraction data and the second extraction data to generate the output image data. Accordingly, a part of the first image is displayed in the first region whereas a part of the second image is displayed in the second region. Therefore, a user may easily compare the first image with the second image when the user observes the output image.

In the aforementioned configuration, the first image may include a first corresponding region in correspondence to the first region. The second image may include a second corresponding region in correspondence to the second region. The extractor may extract data, which represents an image to be displayed in the first corresponding region, as the first extraction data from the first image data and data, which represents an image to be displayed in the second corresponding region, as the second extraction data from the second image data.

According to the aforementioned configuration, the extractor extracts data, which represents an image to be displayed in the first corresponding region in correspondence to the first region, as the first extraction data from the first image data and data, which represents an image to be displayed in the second corresponding region in correspondence to the second region, as the second extraction data from the second image data accordingly a user may easily compare the first image with the second image when the user observes the output image.

In the aforementioned configuration, the first corresponding region may include first strip regions extending in a predetermined direction. The second corresponding region may include second strip regions extending in the predetermined direction. The extractor may generate the output image data so that the first and second strip regions are alternately arranged.

According to the aforementioned configuration, the extractor generates output image data so that the first and second strip regions are alternately arranged. Accordingly, a user may entirely compare the first image with the second image.

In the aforementioned configuration, the predetermined direction may be the horizontal direction or the vertical direction.

According to the aforementioned configuration, the first and second strip regions are alternately arranged in the vertical direction if the first and second strip regions extend in the horizontal direction. Accordingly, a user may easily observe a positional change in the horizontal direction between the first and second images. The first and second strip regions are alternately arranged in the horizontal direction if the first and second strip regions extend in the vertical direction. Accordingly, a user may easily observe a positional change in the vertical direction between the first and second images.

In the aforementioned configuration, the extractor may incorporate first identification data into the first extraction data to display a first identification image which indicates a part of the first image.

According to the aforementioned configuration, the extractor incorporates the first identification data into the first extraction data to display the first identification image which indicates a part of the first image. Accordingly, a user may easily confirm that the image displayed in the first region is a part of the first image.

In the aforementioned configuration, the extractor may incorporate second identification data into the second extraction data to display a second identification image, which indicates a part of the second image.

According to the aforementioned configuration, the extractor incorporates the second identification data into the second extraction data to display the second identification image, which indicates a part of the second image. Accordingly, a user may easily confirm that the image displayed in the second region is a part of the second image.

In the aforementioned configuration, the extractor may incorporate interface data into the output image data to show an interface image for use in an input operation for the output image.

According to the aforementioned configuration, the extractor incorporates the interface data into the output image data to show the interface image for use in the input operation for the output image. Accordingly, a user may use the interface image to easily execute input operations for the output image.

In the aforementioned configuration, the extractor may incorporate boundary data into the output image data to show a boundary line indicating a boundary between the first and second regions.

According to the aforementioned configuration, the extractor incorporates the boundary data into the output image data to show a boundary line indicating a boundary between the first and second regions. Accordingly, a user may easily compare the first image with the second image.

In the aforementioned configuration, the first and second images may be used to display a stereoscopic image. One of the first and second images may be a left image to be viewed by the left eye. The other of the first and second images may be a right image to be viewed by the right eye.

According to the aforementioned configuration, a user may easily compare the left image with the right image. Accordingly, a stereoscopic image is easily created or adjusted.

In the aforementioned configuration, the extractor may incorporate measurement image data into the output image data to show a measurement image for use in measuring a deviation amount between the left and right images.

According to the aforementioned configuration, the extractor incorporates the measurement image data into the output image data to show a measurement image for use in measuring a deviation amount between the left and right images. Accordingly, a user may quantitatively grasp a deviation amount between the left and right images.

In the aforementioned configuration, the first and second images may be used to display a stereoscopic image. One of the first and second images may be a left image to be viewed by the left eye. The other of the first and second images ma be a right image to be viewed by the right eye. The output image may include a measurement image to be used in measuring a deviation amount between the left and right images. The extractor may incorporate measurement image data into the output image data to show a measurement image so that the measurement image overlaps the boundary line.

According to the aforementioned configuration, the measurement image overlaps the boundary line. Accordingly, a user may easily measure a deviation amount between the left and right images.

An image data processing method according to another aspect of the aforementioned embodiment is used for generating output image data which represents an output image including a first region image to be displayed in a first region and a second region image to be displayed in a second region adjacent to the first region. The image data processing method includes steps of extracting a part of first image data representing a first image as first extraction data, which represents the first region image, and a part of second image data representing a second image to be viewed and compared simultaneously with the first image as second extraction data representing the second region image; and generating the output image data from the first extraction data and the second extraction data.

According to the aforementioned configuration, a part of the first image data representing the first image is extracted as the first extraction data representing the first region image of the output image. A part of the second image data representing the second image to be viewed and compared simultaneously with the first image is extracted as the second extraction data representing the second region image. The output image data is generated from the first extraction data and the second extraction data. Accordingly, a part of the first image is displayed in the first region whereas a part of the second region is displayed in the second region. Therefore, a user may easily compare the first image with the second image when the user observes the output image.

INDUSTRIAL APPLICABILITY

The principles of the aforementioned embodiment are applicable to various techniques requiring comparison of two or more types of images.

The invention claimed is:

1. An image data processing device for generating output image data which represents a stereoscopic output image including a first region image to be displayed in a first region and a second region image to be displayed in a second region adjacent to the first region, comprising:
an extractor configured to extract a part of first image data representing a first image as first extraction data, which represents the first region image, and a part of second image data, which represents a second image to be viewed and compared simultaneously with the first image, as second extraction data representing the second region image,
wherein the first image is one of a left image to be viewed by a left eye and a right image to be viewed by a right eye,
wherein the second image is another of the left and right images,
wherein the extractor
(i) processes the first extraction data and the second extraction data to display a combined image of the left and right images,
(ii) incorporates boundary data into the output image data to show a boundary line, which extends horizontally to indicate a boundary between the first and second regions, and
(iii) incorporates measurement image data into the output image data to overlap a measurement image on the boundary line, the measurement image data representing a measurement image to be used for measuring a positional deviation amount between the left and right images, and
wherein the measurement image includes a horizontal line which is thicker than the boundary line and is overlapped with the boundary line.

2. An image data processing device for generating output image data which represents a stereoscopic output image including a first region image to be displayed in a first region and a second region image to be displayed in a second region adjacent to the first region, comprising:
an extractor configured to extract a part of first image data representing a first image as first extraction data, which represents the first region image, and a part of second image data, which represents a second image to be viewed and compared simultaneously with the first image, as second extraction data representing the second region image;
wherein the first image is one of a left image to be viewed by a left eye and a right image to be viewed by a right eye;
wherein the second image is another of the left and right images, and wherein the first image includes a first corresponding region in correspondence to the first region;
wherein the second image includes a second corresponding region in correspondence to the second region;
wherein the first corresponding region includes first strip regions extending in a predetermined direction;
wherein the second corresponding region includes second strip regions extending in the predetermined direction;
wherein the extractor alternately arranges the first and second strip regions to display a combined image of the left and right images;
wherein the extractor incorporates boundary data into the output image data to show boundary lines which horizontally extend to indicate boundaries between the first and second regions to define strip image groups;
wherein the extractor incorporates measurement image data into the output image data to overlap a measurement image on one of the boundary lines, the measurement image data representing the measurement image to be used for measuring a positional deviation amount between the left and right images;
wherein each of the strip image groups includes one of the first strip regions and one of the second strip regions,
wherein the strip image groups are arranged in regions segmented by the boundary lines, respectively, and
wherein the measurement image includes a horizontal line which is thicker than each of the boundary lines and is overlapped with one of the boundary lines.

3. The image data processing device according to claim 2, wherein the predetermined direction is a horizontal direction.

4. The image data processing device according to claim 1, wherein the extractor incorporates interface data into the output image data, the interface data representing an interface image for use in an input operation for the output image.

5. An image data processing method for generating output image data which represents a stereoscopic output image including a first region image to be displayed in a first region and a second region image to be displayed in a second region adjacent to the first region, comprising steps of:
extracting a part of first image data representing a first image as first extraction data, which represents the first region image, and a part of second image data representing a second image to be viewed and compared simultaneously with the first image as second extraction data representing the second region image, the first image being one of a left image to be viewed by a left eye and a right image to be viewed by a right eye, and the second image being another of the left and right images; and
processing the first extraction data and the second extraction data to display a combined image of the left and right images,
incorporating boundary data into the output image data to show a boundary line, which extends horizontally to indicate a boundary between the first and second regions, and
incorporating measurement image data into the output image data to overlap a measurement image on the boundary line, the measurement image data representing the measurement image to be used for measuring a positional deviation amount between the left and right images, and
wherein the measurement image includes a horizontal line which is thicker than the boundary line and is overlapped with the boundary line.

* * * * *